(12) United States Patent
Moon et al.

(10) Patent No.: US 6,831,910 B1
(45) Date of Patent: Dec. 14, 2004

(54) POWER CONTROL DEVICE AND METHOD FOR CONTROLLING A REVERSE LINK COMMON CHANNEL IN A CDMA COMMUNICATION SYSTEM

(75) Inventors: Hi-Chan Moon, Seoul (KR); Jin-Woo Choi, Songnam-shi (KR); Young-Ky Kim, Seoul (KR); Jae-Min Ahn, Seoul (KR); Hyun-Suk Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/274,830

(22) Filed: Mar. 23, 1999

(30) Foreign Application Priority Data

Mar. 23, 1998 (KR) ................................................ 10394
Apr. 14, 1998 (KR) ................................................ 14276

(51) Int. Cl.$^7$ ............................................ H04B 7/216
(52) U.S. Cl. ........................ 370/342; 370/318; 455/522
(58) Field of Search ................................ 370/328, 335, 370/329, 341, 342, 441, 318, 311, 337; 455/522, 69, 70

(56) References Cited

U.S. PATENT DOCUMENTS

| | | | | |
|---|---|---|---|---|
| 5,103,459 A | * | 4/1992 | Gilhousen et al. | 370/206 |
| 5,461,639 A | * | 10/1995 | Wheatley et al. | 370/342 |
| 5,535,239 A | | 7/1996 | Padovani et al. | |
| 5,559,789 A | | 9/1996 | Nakano et al. | |
| 5,570,353 A | | 10/1996 | Keskitalo et al. | |
| 5,604,730 A | * | 2/1997 | Tiedemann, Jr. | 370/252 |
| 5,673,259 A | * | 9/1997 | Quick, Jr. | 370/342 |
| 5,870,393 A | | 2/1999 | Yano et al. | |
| 5,930,366 A | * | 7/1999 | Jamal et al. | 370/509 |
| 6,035,209 A | * | 3/2000 | Tiedemann et al. | 455/115 |
| 6,078,572 A | * | 6/2000 | Tanno et al. | 370/335 |
| 6,091,717 A | * | 7/2000 | Honkasalo et al. | 370/329 |
| 6,169,759 B1 | * | 1/2001 | Kanterakis et al. | 375/130 |
| 6,269,088 B1 | * | 7/2001 | Masui et al. | 370/335 |
| 6,307,844 B1 | * | 10/2001 | Tsunehara et al. | 370/318 |
| 6,310,868 B2 | * | 10/2001 | Uebayashi et al. | 370/335 |
| 6,498,785 B1 | * | 12/2002 | Derryberry et al. | 370/311 |
| 6,512,931 B1 | * | 1/2003 | Kim et al. | 455/522 |
| 6,567,391 B1 | * | 5/2003 | Moon | 370/342 |
| 6,614,771 B1 | * | 9/2003 | Kim et al. | 370/335 |
| 6,643,520 B1 | * | 11/2003 | Kim et al. | 455/522 |
| 6,714,528 B1 | * | 3/2004 | Moon et al. | 370/342 |

FOREIGN PATENT DOCUMENTS

| | | |
|---|---|---|
| EP | 0847147 | 6/1998 |
| JP | 10-013339 | 1/1998 |
| JP | 10-303855 | 11/1998 |
| WO | WO 94/06217 | 3/1994 |
| WO | 9603813 | 2/1996 |

OTHER PUBLICATIONS

Mori et al, "Downlink powercontrol based on predicted SIR for CDMA cellular packet communications", Oct., 2001, IEEE VTS 54th, Vehicular Technology conference, vol. 3, pp. 1879–1883.*

Japanese Office Action issued for Application No. 2000–538451 dated Aug. 5, 2003.

Russian office Action dated Feb. 6, 2002 issued in Russian Appln. No. 2000124332.

* cited by examiner

*Primary Examiner*—Charles Appiah
(74) *Attorney, Agent, or Firm*—Dilworth & Barrese, LLP

(57) ABSTRACT

A common power control channel transmission device for a base station in a CDMA communication system is provided having a selector for receiving power control commands to be transmitted to multiple subscribers and multiplexing the received power control commands; and a spreading modulator for spreading an output of the selector by multiplying the output of the selector by a spreading sequence. The common power control channel transmission device can be used to control power of a reverse link common channel. For the power control of the reverse link common channel, the base station receives a signal from a mobile station via the reverse link common channel, and transmits to the mobile station a power control command for controlling a transmission power of the reverse link common channel according to a measured strength of the received signal.

37 Claims, 33 Drawing Sheets

TIME SLOT WITHIN ONE PCG

| | 1 | 2 | 3 | 4 | 5 | 6 | 7 | 8 | |
|---|---|---|---|---|---|---|---|---|---|
| 8 | 4 | 7 | 6 | 2 | 3 | 1 | 5 | 8 | |
| 7 | 7 | 1 | 3 | 5 | 4 | 6 | 8 | 2 | |
| 6 | 1 | 4 | 2 | 7 | 5 | 8 | 3 | 6 | |
| 5 | 6 | 2 | 8 | 3 | 1 | 4 | 7 | 5 | |
| 4 | 8 | 3 | 1 | 4 | 2 | 5 | 6 | 7 | |
| 3 | 2 | 5 | 7 | 8 | 6 | 3 | 4 | 1 | |
| 2 | 3 | 6 | 5 | 1 | 8 | 7 | 2 | 4 | |
| 1 | 5 | 8 | 4 | 6 | 7 | 2 | 1 | 3 | |
| | 1 | 2 | 3 | 4 | 5 | 6 | 7 | 8 | PCG NUMBER TIME |

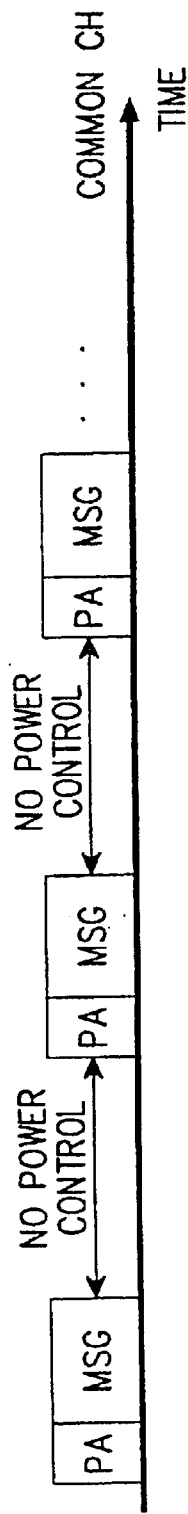
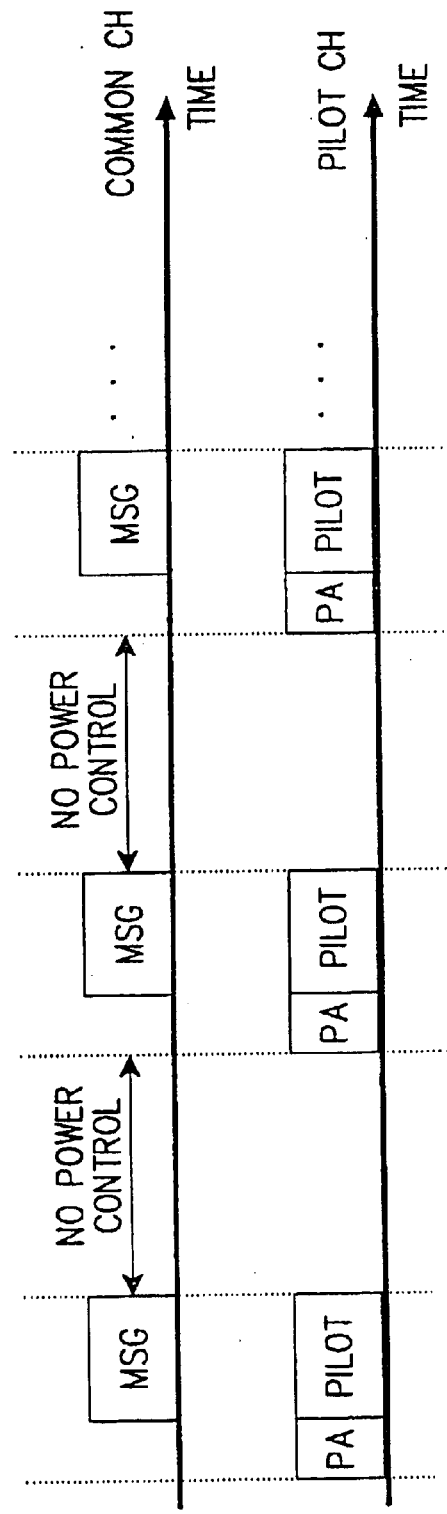
FIG. 22A
FIG. 22B

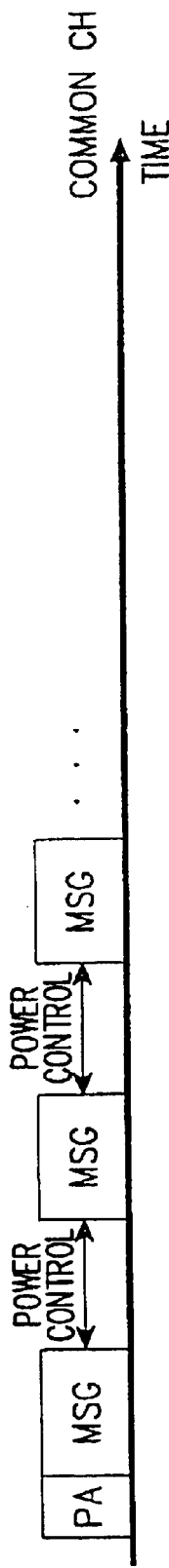
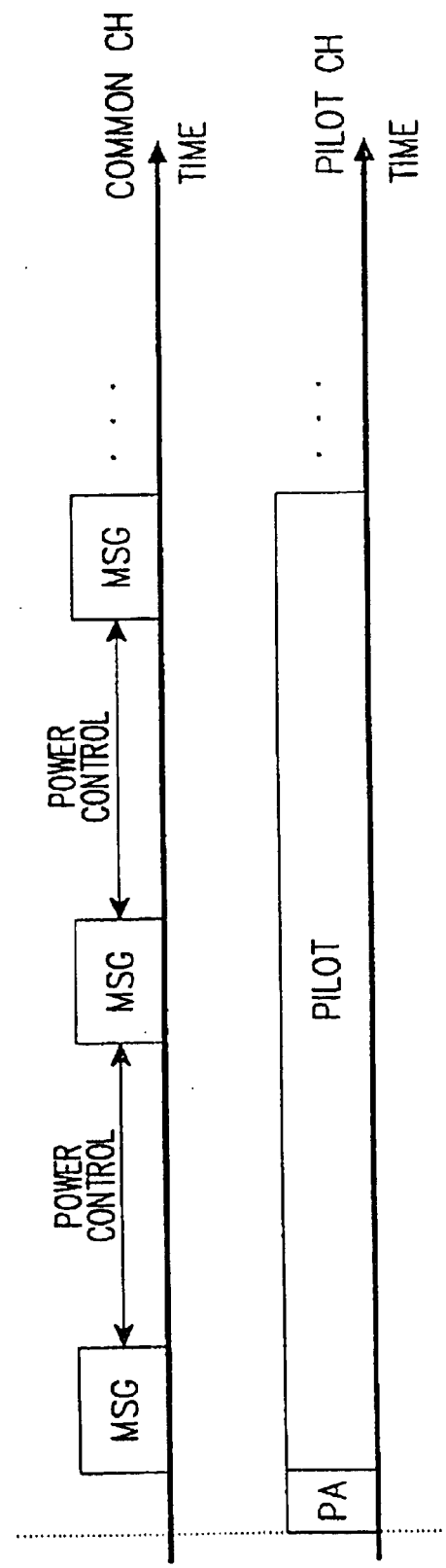
FIG. 23A
FIG. 23B

POWER CONTROL DEVICE AND METHOD FOR CONTROLLING A REVERSE LINK COMMON CHANNEL IN A CDMA COMMUNICATION SYSTEM

BACKGROUND

1. Field of the Invention

The present invention relates to a CDMA communication system, and in particular, to a power control device and method for controlling a reverse link common channel in a CMDA communication system.

2. Description of the Related Art

Code division multiple access (CDMA) mobile communication systems are based on the IS-95 standard which mainly supports voice service. It is foreseen that mobile communications will be performed in accordance with the IMT-2000 (International Mobile Telecommunication-2000) standard in the near future. The IMT 2000 standard provides not only voice service but also high speed packet service. For example, the IMT-2000 standard supports high quality voice service, moving picture service, Internet search service, etc.

The CDMA mobile communication system includes a forward link for transmitting a signal from a base station (BS) to a mobile station (MS) and a reverse link for transmitting a signal from the mobile station to the base station. A conventional CDMA mobile communication system cannot control power of a common channel for the reverse link. This is because an existing CDMA base station does not have structure for controlling the power of the reverse link common channel. Furthermore, it is difficult to send corresponding power control commands to the respective mobile stations using a forward link common channel in which several users receive one Walsh orthogonal channel. Therefore, it takes a long time for the mobile station to access the system through the reverse link common channel, and the mobile station can transmit a short message only. In addition, the mobile station accesses the system without knowing an appropriate initial system access power, thereby exerting influence on the system.

FIG. 1 illustrates a channel transmission device for transmitting a power control command in a conventional CDMA communication system. The illustrated channel transmission device may be used for a traffic channel or a control channel. In describing the channel transmission device, the input data is assumed to be fill rate data of a 20 ms frame.

A cyclic redundancy check (CRC) generator 111 generates 12 CRC bits and adds the generated CRC bits to 172-bit frame data input. A tail bit generator 113 generates 8 tail bits and adds the generated tail bits to an end of the CRC-added frame data to enable an encoder 115 to initialize the data by the frame unit When the 172-bit data is input, the data output from the tail bit generator 113 becomes 192-bit data. The encoder 115 then generates 576 symbols per frame by encoding one-frame data output from the tail bit generator 113, and an interleaver 117 interleaves the encoded data output from the encoder 115.

A bit selector 121 decimates a long code output from a long code generator 119 to match the length of the long code to the length of the interleaved encoded data. An XOR gate 123 XORs the interleaved encoded data and the decimated long code to scramble them. After that, a signal convert 125 maps the output signal levels of the XOR gate 123 by converting a signal level "0" to "+1" and a signal level "1" to "−1", and demultiplexes the converted signals by outputting odd-numbered data to an In-phase channel (first channel) and even-numbered data to a Quadrature-phase channel (second channel). The I- and Q-channel converted signals are gain controlled in channel gain controllers 127 and 129, respectively.

A control bit gain controller 131 controls a gain of an input power control (PC) bit and provides the gain controlled power control bit to puncturers 133 and 135. The puncturers 133 and 135 puncture symbols located at the bit positions designated by a bit selector 121 and insert therein the power control bits output from the control bit gain controller 131. The symbols output from the puncturers 133 and 135 are multiplied by an Walsh code in multipliers 139 and 141, respectively, thus being orthogonally modulated.

Since, the number of the available orthogonal codes is limited in the CDMA communication system and many traffic channels should be assigned to the users for the data communication service, it is expected that the orthogonal codes will run short. Therefore, when the data communication is temporarily discontinued in the state where the traffic channel is formed, it is preferable to temporarily release an orthogonal code for the channel presently in service and reassign the orthogonal code at the time when the data communication is restarted. This increases utility efficiency in the use of the orthogonal codes.

However, the channel transmission device of FIG. 1 assigns the orthogonal code to transmit the power control command, even when there is no actual data to transmit (in other words, even in the case where data transmission is temporarily discontinued), thus resulting in an inefficient use of the orthogonal codes.

SUMMARY

It is, therefore, an object of the present invention to provide a power control device and method for a reverse link common channel in a CDMA communication system, where the CDMA system is based on the IMT-2000 standard.

It is another object of the present invention to provide a device and method for transmitting power control commands to subscribers using a common power control channel in a CDMA communication system.

It is further another object of the present invention to provide a channel reception device and method for receiving and processing a power control command transmitted through a common power control channel in a CDMA communication system.

It is still another object of the present invention to provide a device and method for transmitting power control commands for reverse link common channels to subscribers using a common power control channel in a CDMA communication system.

It is further still another object of the present invention to provide a device and method for receiving a power control command for a reverse link common channel through a common power control channel in a CDMA communication system.

It is still another object of the present invention to provide a device and method for designating a reverse link common channel to a specific mobile station and controlling a transmission power of a mobile station through the designated reverse link common channel in a CDMA communication system.

It is still another object of the present invention to provide a device and method for designating a reverse link common channel to a mobile station and enabling the mobile station to control a transmission power of the designated reverse link common channel according to a power control bit received via a forward common power control channel in a CDMA communication system.

It is still another object of the present invention to provide a mobile station device and method for a CDMA communication system, in which the mobile station requests a base station to designate a reverse link common channel and then transmits a signal via a designated reverse link common channel upon reception of a message for designating the reverse link common channel in response to the request, and controls a transmission power of the designated reverse link common channel via a forward common power control channel.

To achieve the above objects, a common power control channel transmission device for a base station in a CDMA communication system is provided which includes a selector for receiving power control commands to be transmitted to multiple subscribers and multiplexing the received power control commands; and a spreading modulator for spreading an output of the selector by multiplying the output of the selector by a spreading sequence. The common power control channel can be used even in the case where the base station controls a power of the reverse link common channel. For the power control of the reverse link common channel, the base station receives a signal from a mobile station via the reverse link common channel, and transmits to the mobile station a power control command for controlling a transmission power of the reverse link common channel according to a strength of the received signal.

BRIEF DESCRIPTION OF THE DRAWINGS

FIGS. 22A through 25B are diagrams illustrating relationships between a message transmission type and the power control.

DETAILED DESCRIPTION OF PREFERRED EMBODIMENTS

Figure 1:
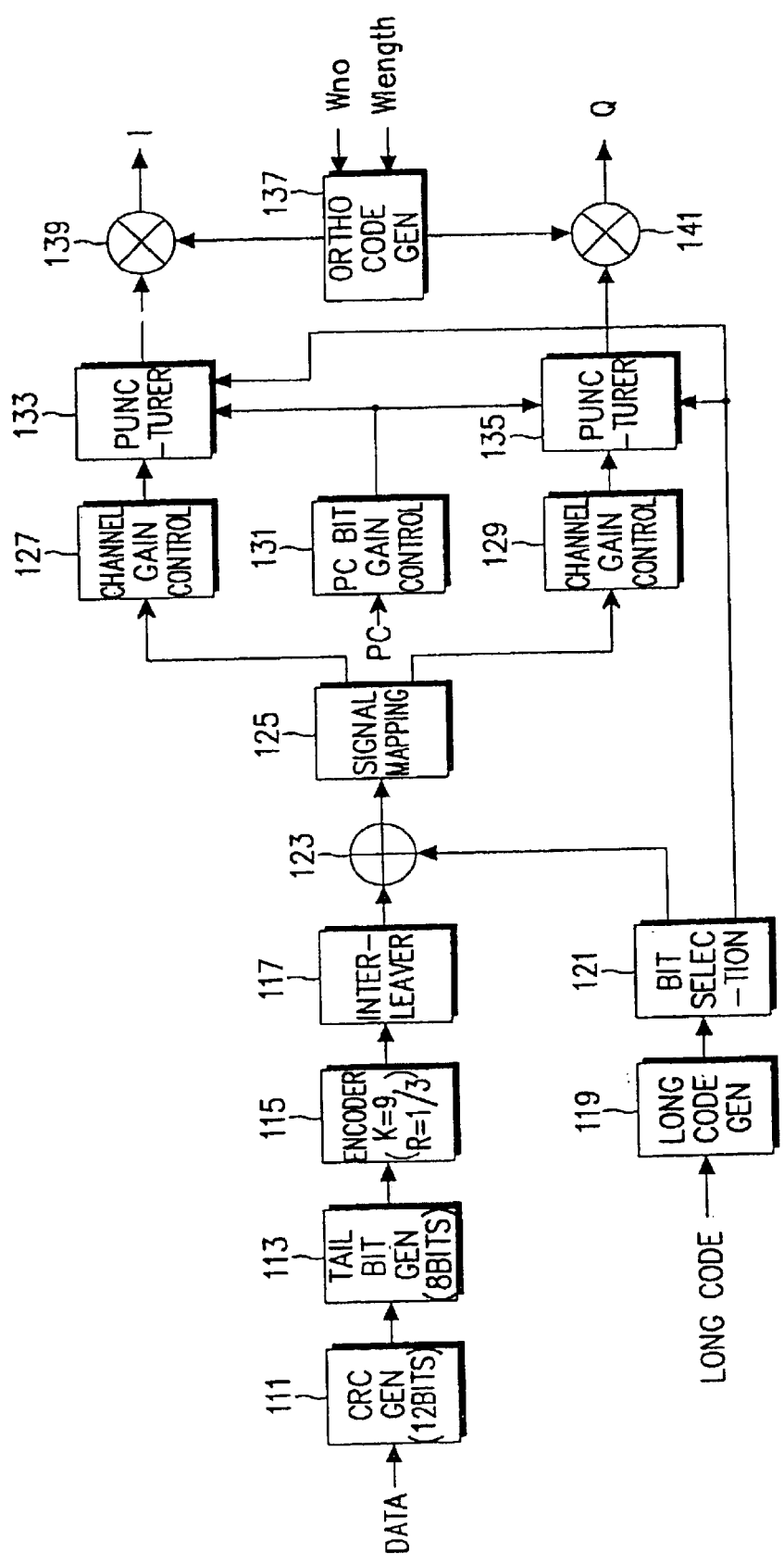
FIG. 1 is a block diagram illustrating a prior art channel transmission device for transmitting a power control command in a conventional CDMA communication system.

It is to be understood that in the following description of preferred embodiments, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 2:
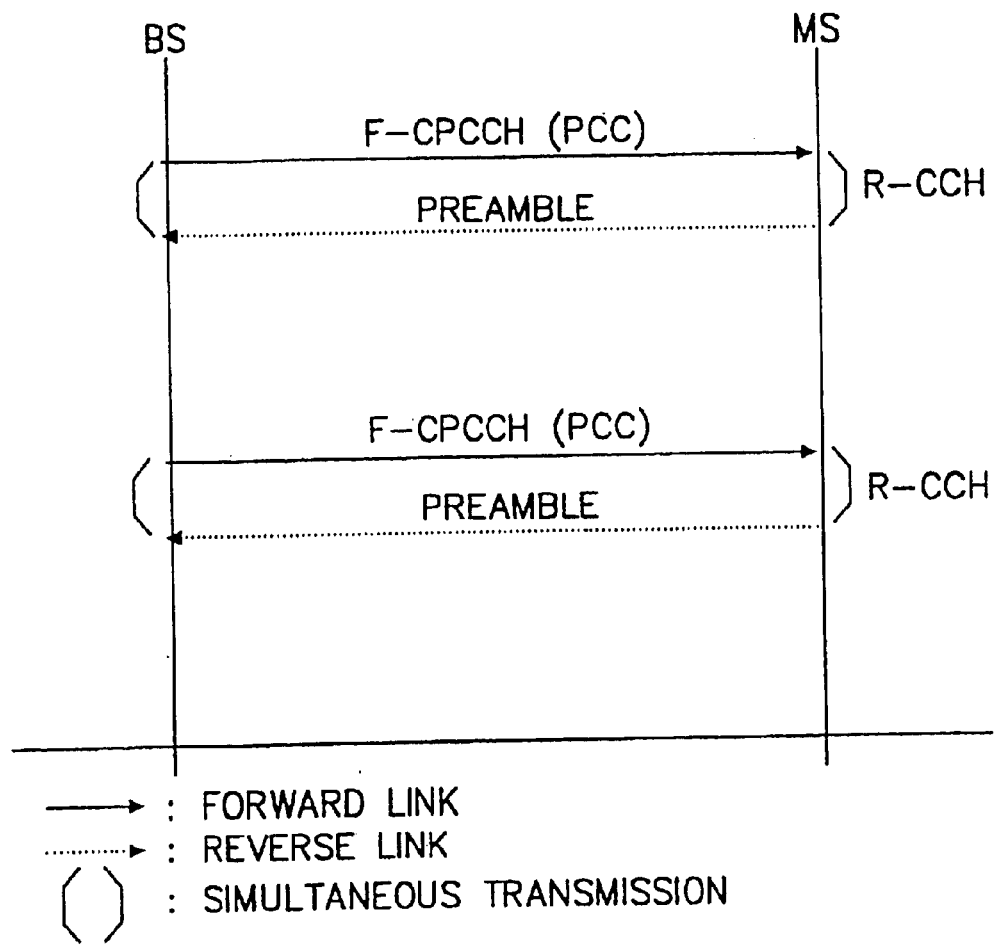
FIG. 2 is a schematic diagram illustrating a procedure for controlling power of a reverse link common channel during data communication between a base station and a mobile station according to a first embodiment of the present invention.
Figure 3:
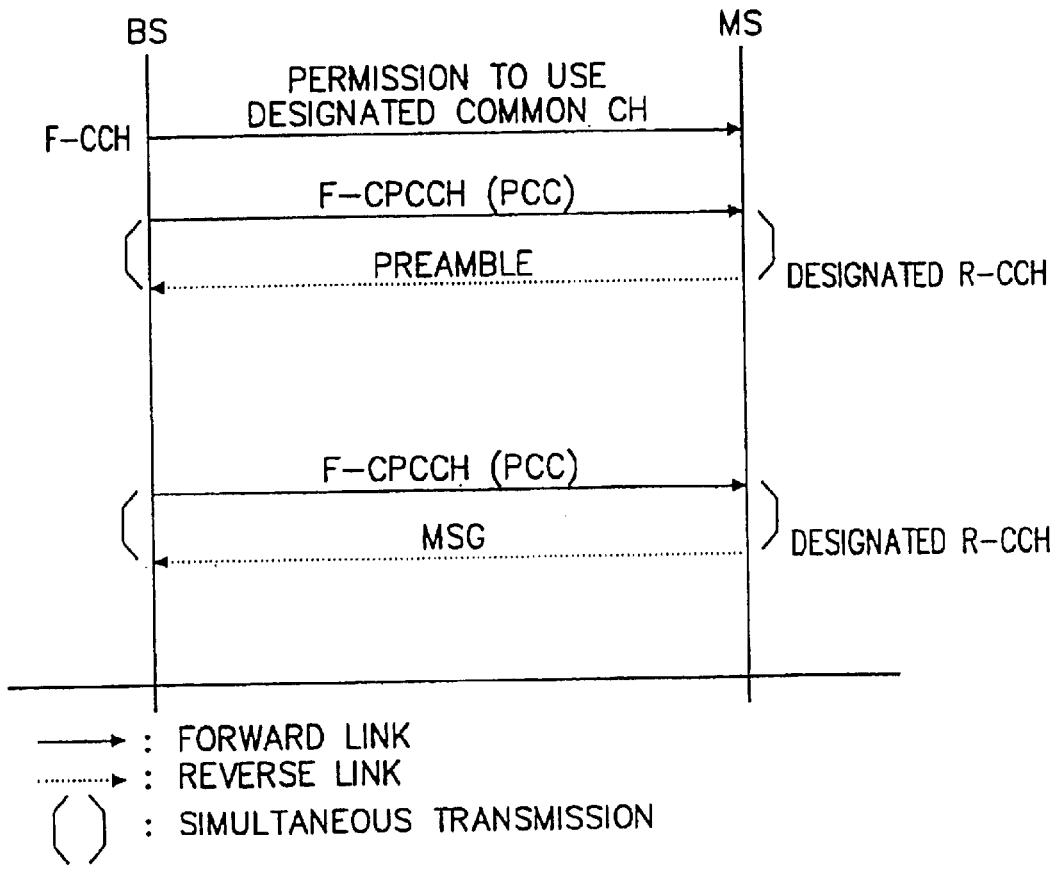
FIG. 3 is a schematic diagram illustrating a procedure for controlling power of a reverse link common channel during data communication between a base station and a mobile station according to a second embodiment of the present invention.
Figure 4:
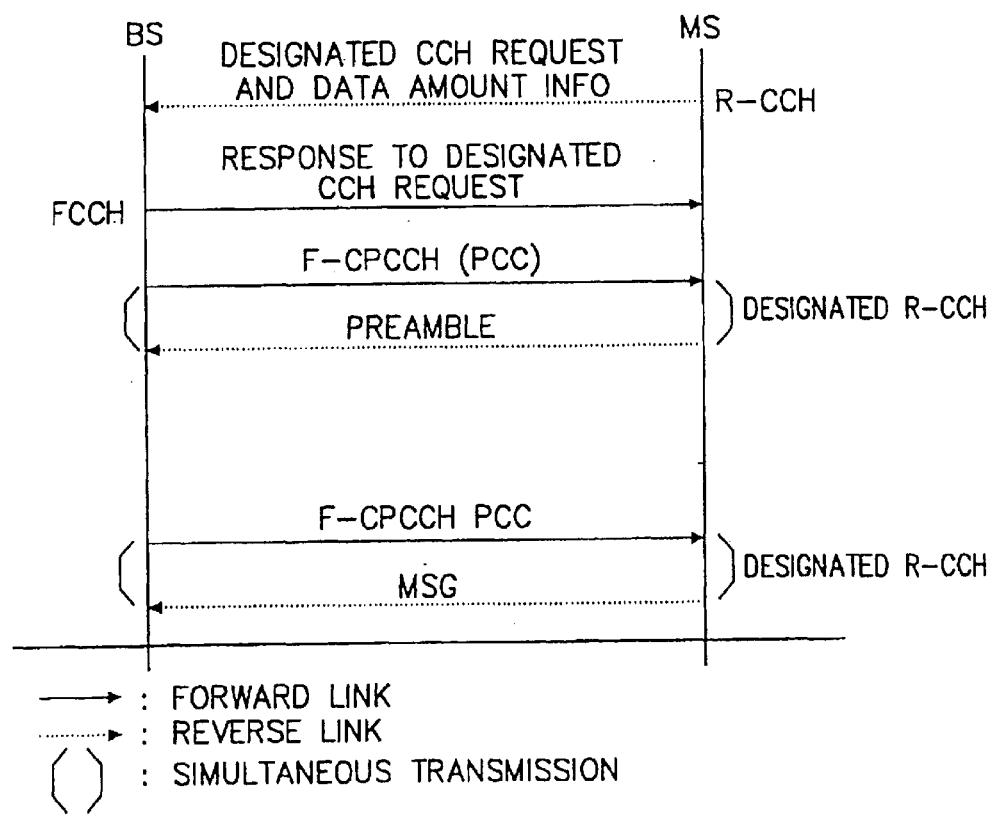
FIG. 4 is a schematic diagram illustrating a procedure for controlling power of a reverse link common channel during data communication between a base station and a mobile station according to a third embodiment of the present invention.

With reference to FIGS. 2 through 4, there are shown schematic diagrams illustrating procedures for controlling power of a reverse link common channel during data communication between a base station and a mobile station according to first through third embodiments of the present invention, respectively. In particular, the schematic diagram of FIG. 2 illustrates a case in which all the reverse link common channels are power controlled, and the schematic diagrams of FIGS. 3 and 4 illustrate cases in which designated reverse link common channels are power controlled. In addition, it is assumed that non-designated reverse link common channels operate in a slotted Aloha mode, such as in the IS-95A standard. For example, in FIG. 3, the reverse link common channel used when a mobile station sends to a base station an initial designation request message (i.e., a request for a designated common channel), operates in the slotted Aloha mode.

Referring to FIG. 2, the mobile station (MS) transmits a preamble signal via a reverse link common channel, and the base station (BS) sends to the mobile station a power control command via a forward common power control channel. Here, the reverse link common channel operates in the slotted Aloha mode and a slot start position of a new message is predefined between the base station and the mobile station. The mobile station transmits an intended message signal at a specified time after sending the preamble signal for a predetermined amount of time. There are three preferred methods for determining the proper time at which the mobile station can transmit the message signal.

In a first preferred method, the mobile station transmits the message signal after sending the preamble signal for a predetermined amount of time. That is, the mobile station transmits the preamble signal to the base station. After the base station attains initial acquisition by receiving the preamble signal for the predetermined amount of time, the mobile station transmits the intended message signal to the base station at the specified time.

In a second preferred method, the base station informs the mobile station by transmitting a message signal the time at which the mobile station can transmit the message signal via the reverse link common channel. For initial power control, the base station sends a power control command via the forward common power control channel by measuring an intensity of the preamble signal received from the mobile station. Upon reception of the power control command, the mobile station then controls the transmission power according to the received power control command. That is, upon acquisition of the preamble signal transmitted from the mobile station, the base station measures the signal intensity for the preamble duration and determines whether the measured intensity is appropriate. The base station sends the power control command by generating a power control bit (or power control command) according to the measurement. The mobile station then controls the transmission power of the preamble signal according to the received power control command and sends the power controlled preamble signal to the base station. Further, the mobile station does not send the message before reception of a message transmission command from the base station or for a predetermined amount of time, and continuously transmits only the preamble signal via the reverse link common channel to control the initial power until the message transmission command is received from the base station.

In a third preferred method, the mobile station controls the transmission power according to the power control command at a time predetermined between the mobile station and the base station, and sends the power controlled message via the reverse link common channel.

In the preamble transmission procedure, the parameters that should be matched between the mobile station and the system or the signals for initial acquisition of the other party, known between the mobile station and the system are transmitted prior to transmission of a main message. For example, the signals known between the mobile station and the system may be all "0"s or "1"s.

While the base station sends the power control command to power control the reverse link common channel, a power of the power control command received from the mobile station may become lower than a threshold value or the forward link may have a bad channel condition. In this case, it is necessary for the mobile station to stop sending the signals. Here, the channel condition of the forward link can be determined by measuring Ec/Io of a pilot channel for the forward link. This is to reduce the system interference which may be caused when the mobile station sends the message via the reverse channel in a state where the power is not appropriately controlled.

Referring to FIG. 3, the base station sends, via the forward link common channel, a command for ordering the mobile station to send the message using a designated common channel for the reverse link, together with information required in sending the command. This procedure can be available in the case where the base station requests a certain response message from the mobile station or requests the mobile station to send specific data. Here, the mobile station sends only the preamble signal (or pilot signal) until the base station sends a message transmission command or for a predetermined time, so as to control the transmission power between the base station and the mobile station. The base station sends a power control command via the forward common power control channel in response to the signal from the mobile station. Upon reception of the message transmission command from the base station or after a lapse of the predetermined time, the mobile station sends to the base station an intended message via the designated channel for the reverse link. Even at this time, the base station continues to send the power control command so as to continuously control the power while the mobile station sends the message.

Here, the designated common channel refers to a specific channel which can be exclusively used by a specific user, among the common channels which can be used in common by all the users. For designation of the common channels, several codes are separately provided in addition to the codes for the common channels, and one of the codes is assigned to a particular user for a while. Alternatively, for designation of the common channels, one of the common channels is assigned to the particular user who requires a designated channel, and therefore the other users cannot use this channel while it is being used by the particular user. In designating the reverse link common channels, it is possible to designate which long codes will be used as spreading codes. The long codes may be the existing public long codes, the long codes for the access channels, the long codes for the common control channels, or the separate long codes for channel designation.

Referring to FIG. 4, the mobile station sends to the base station a message for requesting a designated common channel via the common channel for the reverse link. Here, the mobile station can send the message after adding information about an amount of the data to be sent through the designated common channel. The request message may be an ID of the mobile station (e.g., ESN). Upon reception of the designated channel request message and the data amount information, the base station determines whether to designate the common channel taking into consideration the use and amount of the data to be sent from the mobile station which requests the designated channel and the system condition, and sends a response signal to the mobile station using the common channel for the forward link. When the response signal includes channel designation information, the base station sends a power control command after a lapse of a specified time. Here, the mobile station transmits the preamble signal until the base station sends a message transmission command for allowing the mobile station to send the message via the designated channel based on the response signal or for a predetermined time, so as to enable the base station to use this preamble in demodulation. In addition, the preamble duration can be used in controlling the transmission power of the designated reverse link common channel. Upon reception of the message transmission command from the base station or after a lapse of the predetermined time, the mobile station sends to the base station the intended message via the designated channel for the reverse link. Even at this time, the base station continues to send the power control command to continuously control the power while the mobile station sends the message.

To power control the reverse link common channel, the base station should send the power control command to the mobile station via the forward link. However, when the mobile station sends the reverse link common channel, a dedicated channel is not assigned for the forward link and the data or control command is transmitted through the forward common channel. When the dedicated channel is not assigned for the forward link and one Walsh channel is used by several users like the common channel, it is difficult to send the power control commands to the respective mobile stations. Although the power control commands described in FIGS. 2 to 4 can be sent by puncturing the power control bits into the forward common channel, it is also possible to use another specific channel such as a common power control channel.

Figures 5A, 5B:
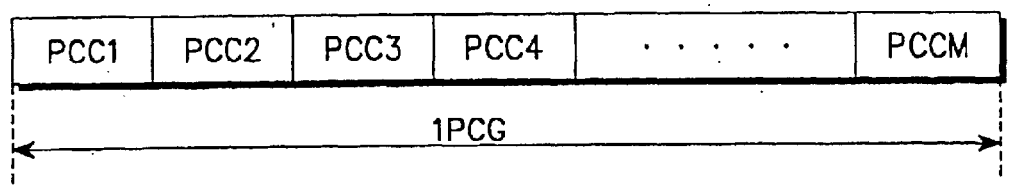
FIG. 5A illustrates a power control command transmitted via a common power control channel according in accordance with the present invention.
FIG. 5B illustrates a look-up table for storing a hopping pattern by which power control commands are inserted into slot positions of the common power control channel in accordance with the present invention.

FIG. 5A is a diagram illustrating the power control command transmitted via the common power control channel in accordance to the present invention. The base station assigns one common orthogonal code to the common power control channel and sends the power control commands to multiple subscribers via this common power control channel. A power control group (hereinafter, referred to as PCG) has a length which is a reciprocal of a transmission frequency of the power control commands. That is, when the power control commands are transmitted 800 times for one second, the length of one PCG becomes 1.25 msec (=1/800 sec). Further, in the figure, PCC1–PCCM represent the power control commands for the respective subscribers, and one common power control channel can transmit M power control commands in maximum. That is, as shown in FIG. 5A, one PCG consists of M power control commands PCC1–PCCM for M subscribers and the PCG is spread with one orthogonal code and transmitted via the common power control channel.

The power control commands PCC1–PCCM for the respective subscribers can be transmitted via the common power control channel by fixing their positions. However, when the transmission powers of the power control commands are different or when the slots at which the power control commands are transmitted are mixed with the slots at which the power control commands are not transmitted, it is preferable to hop the positions of the power control commands. This causes the power control commands to be randomly placed within one power control group so as to reduce interference according to the slot positions and provide a uniform transmission spectrum of the base station. In this case, a hopping pattern of the power control commands can be implemented in a similar manner as a method used for implementing the frequency hopping pattern of a FH-SS (Frequency Hopping-Spread Spectrum) system. In the embodiment, the hopping pattern of the power control commands is stored in a look-up table to pseudo-randomize the positions of the power control commands.

Figure 5C:
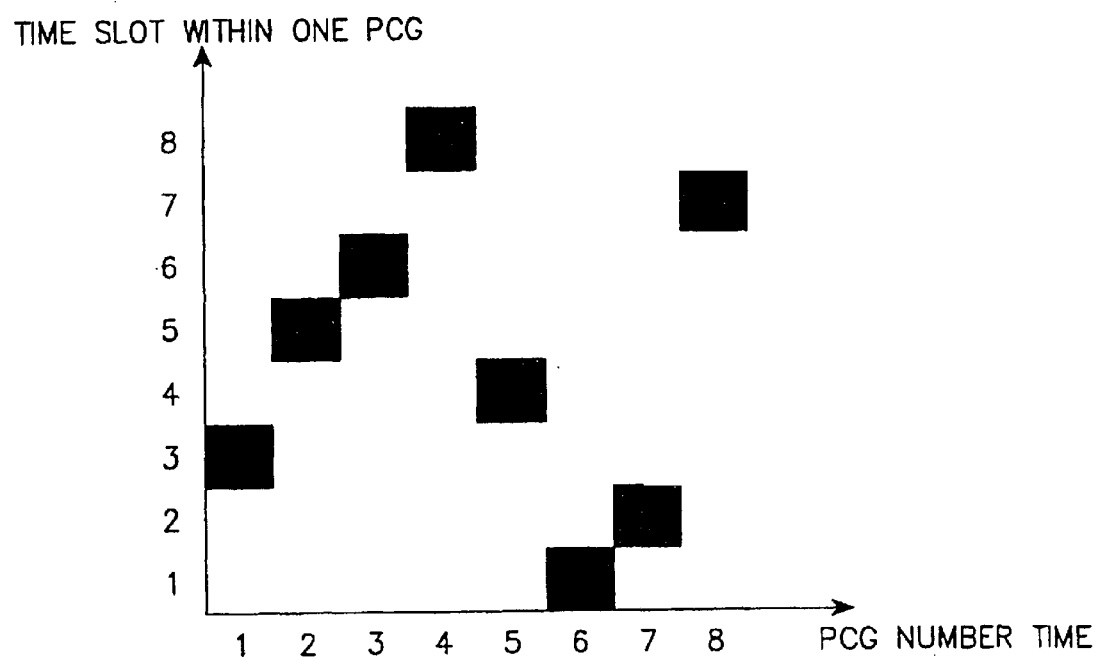
FIG. 5C is a chart illustrating a slot hopping pattern of a power control command for a subscriber having a slot ID number of 2 in the slot ID look-up table shown by FIG. 5B.

FIG. 5B illustrates a look-up table for storing the hopping pattern by which the power control commands are inserted into the slots of the common power control channel in accordance with the present invention. In FIG. 5B, the number of the power control commands, M, is assumed to be 8. In the figure, numerals in the respective boxes represent slot ID numbers assigned to the subscribers. Accordingly, the positions of the power control commands within one PCG for the common power control channel depend upon the slot ID number and PCG number. FIG. 5C is a chart illustrating a slot hopping pattern for the power control commands, having the slot ID number of 2, in the slot ID look-up table of FIG. 5B.

Figure 6:
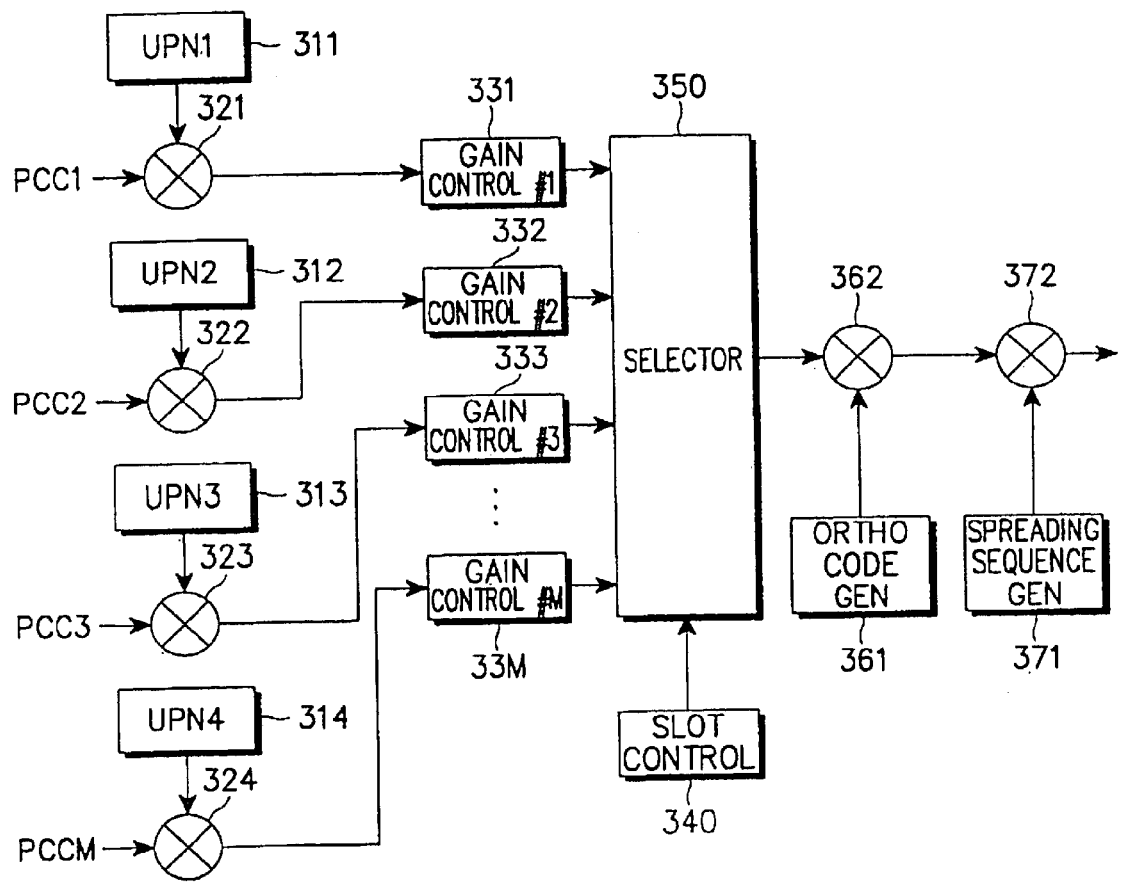
FIG. 6 is a block diagram illustrating a common power control channel transmitter for transmitting power control commands in a CDMA communication system according to an embodiment of the present invention.

FIG. 6 is a block diagram illustrating a common power control channel transmitter for transmitting the power control commands to the respective subscribers which share the same orthogonal code and belong to one power control group. The power control commands PCC1–PCCM transmitted to the respective subscribers can be scrambled by user's pseudo-random noise (UPN) sequences UPN1–UPNM. UPNs 311–31M generate unique PN sequences (e.g., long codes) assigned to the respective subscribers. Multipliers 321–32M multiply the power control commands PCC1–PCCM by the corresponding user's PN sequences UPN1–UPNM, respectively. The respective power commands are multiplied by different gains and then transmitted to the corresponding subscribers. That is, gain controllers 331–33M receive the power control commands output from the corresponding multipliers 321–32M and control gains of the received power control commands according to corresponding gain control signals. The locations of the assigned power control commands can be fixed on the common power control channel. Alternatively, the locations of the power control commands can be varied at the respective PCGs to provide a uniform spectrum. A slot controller 340 generates a signal for determining the slot positions into which the power control commands output via the common power control channel are inserted. That is, the slot controller 340 includes the slot hopping look-up pattern table structured as shown in FIG. 5B and generates a slot control signal for designating time slots into which the power control commands for the respective subscribers are inserted, by consulting the slot hopping pattern table.

A selector 350 receives the gain controlled power control commands PCC1–PCCM and multiplexes the received power control commands according to the slot control signal output from the slot controller 340. That is, the selector 350, under the control of the slot control signal output form the slot controller 340, selects one of the power control commands PCC1–PCCM and outputs the selected power control command to the common power control channel. A multiplexer can be used for the selector 350.

An orthogonal modulator is composed of an orthogonal code generator 361 and a multiplier 362. The orthogonal code generator 367 generates an orthogonal code for orthogonally modulating the power control commands transmitted through the common power control channel, and the multiplier 362 multiplies the power control commands for the respective subscribers output from the selector 350 by the orthogonal code. That is, the orthogonal modulator modulates the power control commands for several subscribers using one orthogonal code and outputs the orthogonally modulated power control commands to the common power control channel.

A spreading modulator is composed of a spreading sequence generator 371 and a multiplier 372. The spreading sequence generator 371 generates a spreading sequence for spreading the orthogonally modulated signals. The multiplier 372 multiplies the orthogonally modulated signals by the spreading sequence to spread the power control commands and outputs the spread power control commands via the common power control channel. Although the orthogonal modulator and the spreading modulator employ binary phase shift keying (BPSK) modulation, they also can employ quadrature phase shift keying (QPSK) modulation. In this case, the power control commands output from the selector 350 are demultiplexed to output odd-numbered power control commands to a first channel and even-numbered power control commands to a second channel. Thereafter, the divided channel signals are separately subjected to the orthogonal modulation and the spreading modulation.

In the exemplary embodiment, the power control commands transmitted to the respected subscribers via the common power control channel are scrambled with the corresponding user's PN sequences UPN1–UPNM and output to the corresponding gain controllers 331–33M. However, it is possible to remove the scheme for scrambling the power control commands with the user's PN sequences. In this case, the power control commands PCC1–PCCM are directly applied to the corresponding gain controllers 331–33M. The gain controllers 331–33M then multiply the received power control commands by the corresponding gains and output them to the selector 350.

The slot controller 340 designates the time slots for arranging the power control commands to be transmitted to the respective subscribers, on the common power control channel. As illustrated in FIG. 5A, the slot controller 340 assigns the positions of the respective power control commands for the respective power control groups. There are two known methods for assigning the power control commands: one method fixes the positions of the power control commands and the other method varies the positions for the respective PCGs. In the embodiment shown by FIG. 6, the slot controller 340 includes the slot hopping pattern look-up table of FIG. 5B and variably designates the insert positions of the power control commands for the respective subscribers. The selector 350 assigns the power control commands output from the gain controllers 331–33M and as shown by FIG. 5A to the specified locations according to the slot control signal output from the slot controller 340.

The power control commands are then multiplied by the orthogonal code in the multiplier 362 to be orthogonally modulated and again multiplied by the spreading sequence in the multiplier 372 to be spread.

If the base station sends the power control commands for the respective subscribers via the common power control channel for the forward link, the mobile stations control the transmission power of the reverse link according to the power control commands received. In most cases, the mobile stations should receive user data and control commands via the traffic channels, in addition to the power control commands received via the common power control channel. For this, the mobile stations employ one of the following two receiver types: a separate receiver consisting of a common power control channel receiver and a traffic channel receiver; and a shared receiver which receives the power control commands on the common power control channel using the traffic channel receiver. The traffic channel refers to a control channel and a data channel for transmitting the control commands and the user data. Here, the traffic channels include a fundamental channel for transmitting voice traffic and a supplemental channel for transmitting packet data. The structure of the mobile station will be described later on.

Figure 7:
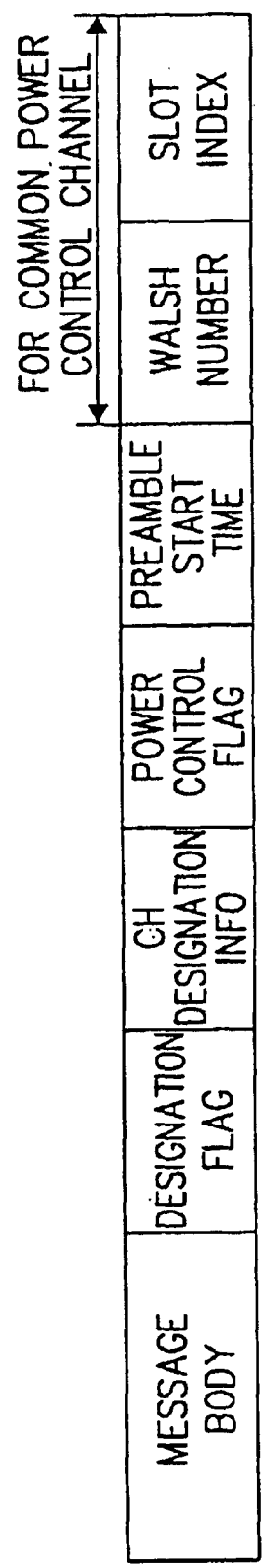
FIG. 7 illustrates a message structure on the common power control channel when a base station designates the reverse link common channel.

FIG. 7 illustrates a message structure that the base station sends to the mobile station via the forward link for assigning the designated reverse link common channel, when the common power control channel is used. The message can be used as the response message when the base station assigns the designated reverse link common channel to the mobile station as shown in FIG. 3, or when the base station requests the designated reverse link common channel as shown in FIG. 4. As illustrated, the message consists of a message body having specific contents, a designation flag, channel designation information representing the designated common channel for the reverse link, a power control flag representing whether to control the power, preamble start time information representing a start time of the preamble signal, a Walsh number representing a Walsh code number used for the common power control channel, and a slot index representing the locations of the power control commands. When the common power control channel is not used, the Walsh number and the slot index are excluded from the message.

The designation flag represents whether the designated common channel is available or not. The channel designation information is identification information for the designated channel when the designated channel is available. The channel designation information can be used in informing a long code to be used for spreading the reverse link common channel in the mobile station. When the long code is already known to the mobile sation, the channel designation information may represent whether the long code is used or not. The successive power control flag and preamble are also valid only when the designated channel is used. The common power control command includes the Walsh number and the slot index for the common power control channel assigned to the mobile stations. The Walsh number, which is a system parameter, is not required to be transmitted separately, when it is previously known to the mobile station or predefined like the existing forward pilot channel. The slot index may designate fixed positions when the power control commands are located at the fixed positions or designate corresponding slot IDs when the positions of the power control commands are varied in several forms. Even when the position of the slot index is changed pseudo-randomly for the respective PCGs, it is not necessary to transmit the slot index when it is known to the base station and the mobile sation.

Further, when the mobile station sends a message by power controlling the common channel for the reverse link, the preamble signal is used for the initial power control. Although the time for starting transmission of the preamble signal can be set after a lapse of a predetermined time succeeding a message for assigning the designated reverse link common channel, the base station can designate the preamble start time information within the message structure of FIG. 7.

Figure 8A:
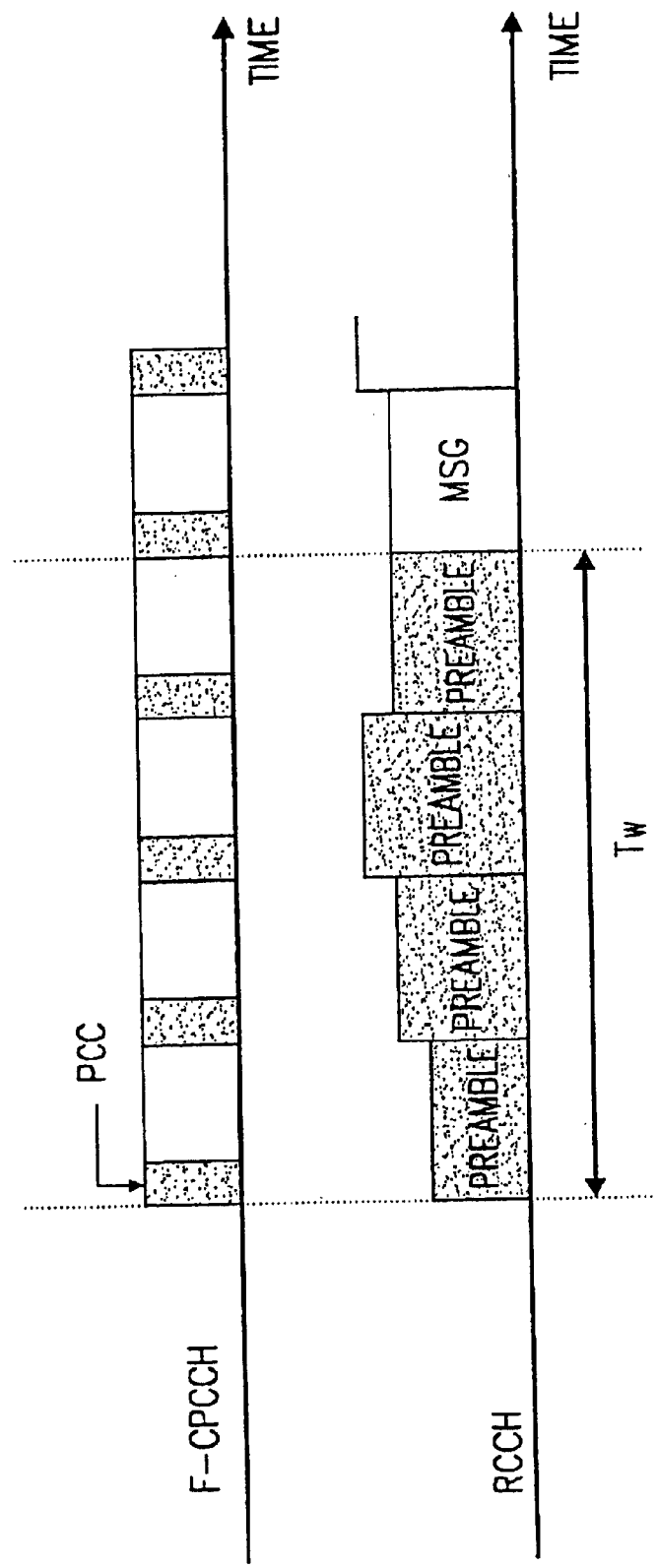
FIGS. 8A and 8B illustrate the power control procedures in a case where a message is transmitted by power controlling the reverse link common channel according to a first embodiment of the present invention.
Figure 8B:
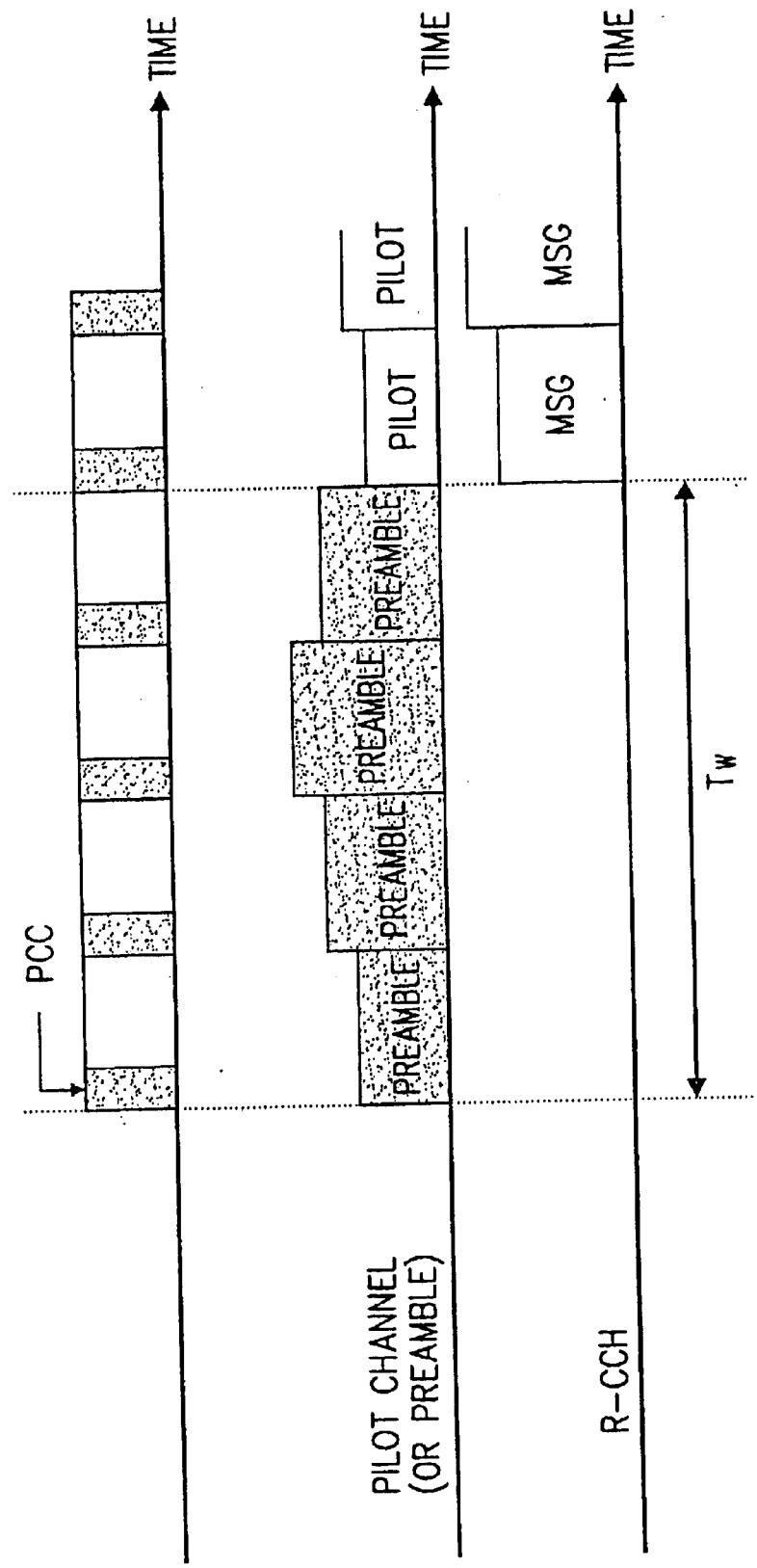

FIGS. 8A and 8B illustrate the power control procedures when the message is transmitted by power controlling the reverse link common channel according to a first embodiment of the present invention. The reverse link common channels are assumed to operate in the slotted Aloha mode where they are not designated as in the IS-95standard so that they may collide with each other. Here, it is assumed that the slot IDs of the common power control channel and the reverse link common channels are previously matched between the base station and the mobile station on a one-to-one (or point-to-point) basis.

Referring to FIG. 8A, the base station sends the power control command to the mobile station, and the mobile station sends the message MSG after transmitting the preamble signal for the predetermined time, to use the power controlled reverse link common channel. A description will be made as to an operation of controlling the initial power of the base station and the mobile sation while the mobile station transmits the preamble signal. The power of the initial preamble that the mobile station sends is calculated by the following equation:

Initial Transmission Power=(1st Constant)−(Total Receiving Power of Mobile Station) [dB]  (1)

Initial Transmission Power=(2nd Constant)−(Receiving power, Ec/Io, of Pilot Signal from Connected Base Station) [dB]  (2)

In equations (1) and (2), different constants can be used for the respective systems. These values should be low enough to minimize interference with the system. In addition, since the initial transmission power is set to a sufficiently low value within a normal operation range, the base station sends a power-up command until the preamble signal sent from the mobile station is acquired during the power control process. Upon acquisition of the preamble signal from the mobile station, the base station estimates a receiving power of the signal and sends a power control command according to the estimation. In this manner, it is possible to adjust the receiving power of the reverse link to an appropriate range prior to sending an actual message, when the base station fails to acquire the preamble signal because the initial power of the reverse common channel is too low, or when the mobile station sends the reverse link common channel with an excessively high power. This procedure will be defined as "initial power control". Since the base station can compare the receiving power (or strength) of the reverse link after acquisition of the preamble signal sent from the mobile station, the base station can send the power-up command or the power-down command to the mobile station.

In the embodiment, a duration TW or the amount of time the mobile station transmits the preamble signal to control the initial power is predefined. However, the duration TW can be varied by sending a message transmission command to the mobile station at the time when it is judged that the base station has controlled the power appropriately by acquiring the preamble signal. Hence, the mobile station can stop transmitting the preamble signal prior to the predefined duration TW.

FIG. 8A corresponds to the case where the pilot channel is not transmitted together with the message via the reverse link common channel. This is the case where the reverse link common channel does not include the pilot channel as is the case with the IS-95 standard. However, for coherent demodulation, the reverse link according to the IMT-2000 standard transmits the pilot channel together with the message. The pilot channel is used for estimating the channel condition by the base station receiver and synchronizing the transmitter with the receiver.

Referring to FIG. 8B, the signal transmitted via the pilot channel during the initial power control serves as the preamble signal, and after completion of the initial power control serves as the pilot signal. The strength of the signal serving as the pilot signal can be different from that of the signal serving as the preamble signal. When the preamble signal is transmitted via the pilot channel in this manner, the common channel for the reverse link maintains a standby state without generating other signals for a predefined time TW or until the base station sends a message transmission command, as described above. This is the same for the designated common channel illustrated by FIG. 9B and described below.

Figure 9A:
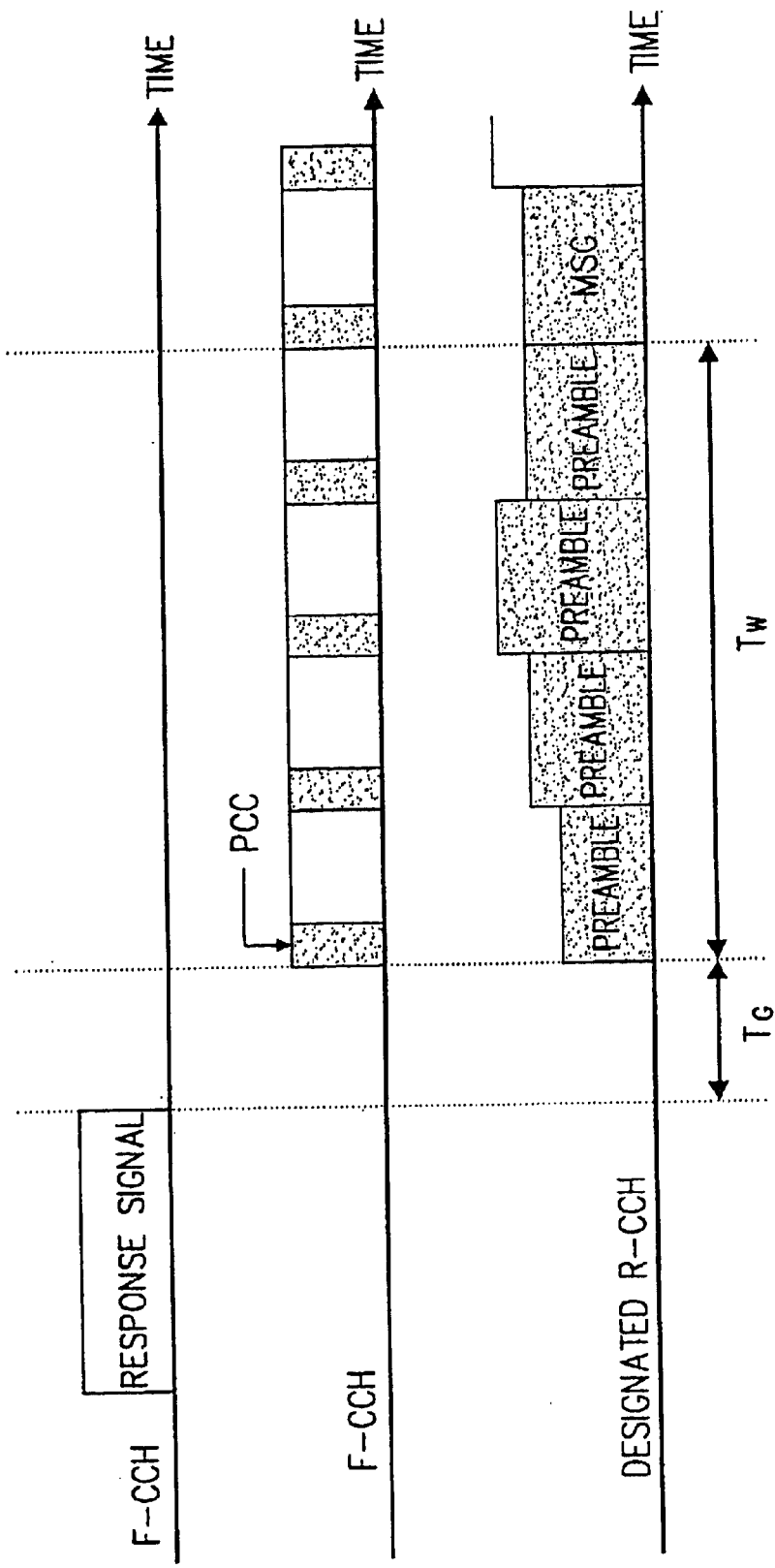
FIGS. 9A and 9B illustrate the power control procedures in a case where a message is transmitted by power controlling a designated common channel for the reverse link according to a second embodiment of the present invention.
Figure 9B:
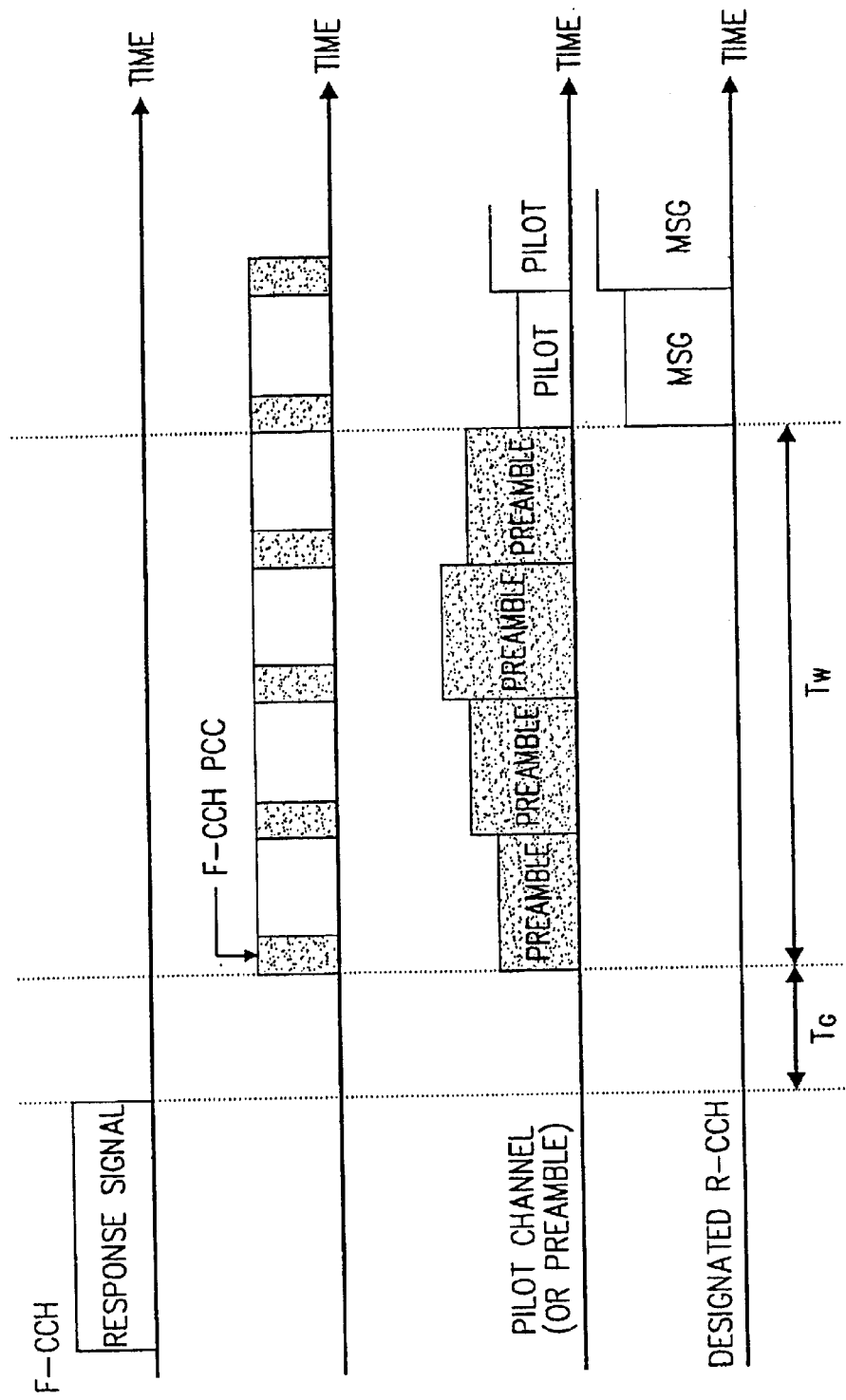

FIGS. 9A and 9B illustrate the power control procedures when the message is transmitted by power controlling the designated common channel for the reverse link according to a second embodiment of the present invention. Here, the power control can be achieved equally as described with reference to FIGS. 8A and 8B.

Referring to FIGS. 9A and 9B, the mobile station sends a request message for the designated reverse link common channel via the reverse link common channel. Upon reception of the request message, the base station grants the mobile station to use the designated reverse link common channel via the forward link common channel, and sends a response signal having the channel designation information. Taking into consideration the transmission delay of the response signal and the reception delay of the mobile station, the mobile station sends the message after waiting for a predefined time TG and transmits the preamble signal during the time TW. The base station also sends the power control command after a lapse of the time TG and the mobile station transmits, as illustrated, the preamble signal and the message via the designated reverse link common channel by controlling the power according to the power control command received from the base station. The initial power control is performed between the base station and the mobile station for the time TW where the pilot signal serving as the preamble signal is transmitted via the pilot channel.

Figure 10A:
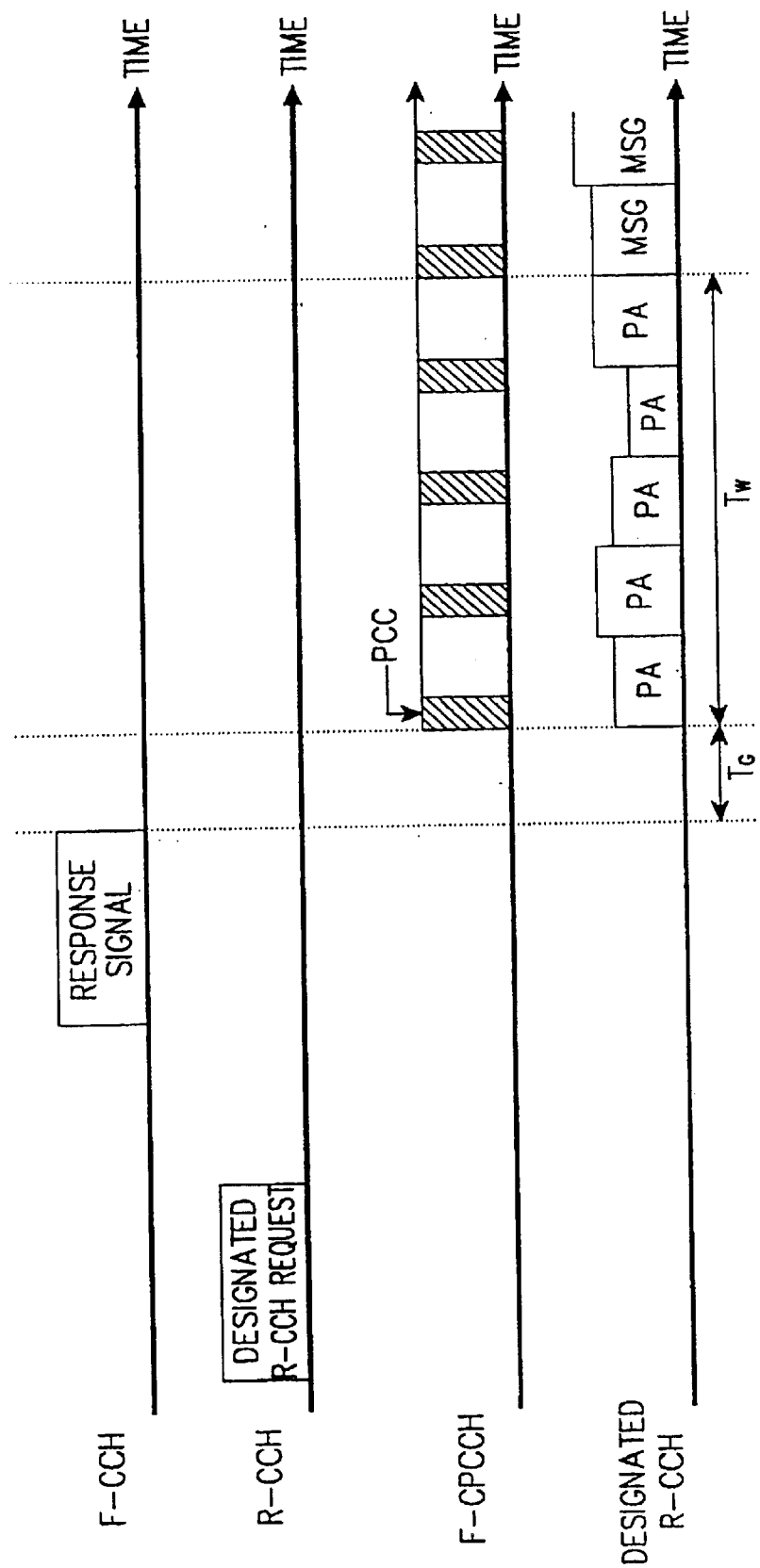
FIGS. 10A and 10B illustrate the power control procedures in a case where a base station designates a reverse link common channel at the request of a mobile station and the mobile station transmits a message by power controlling the designated reverse link common channel according to a third embodiment of the present invention.
Figure 10B:
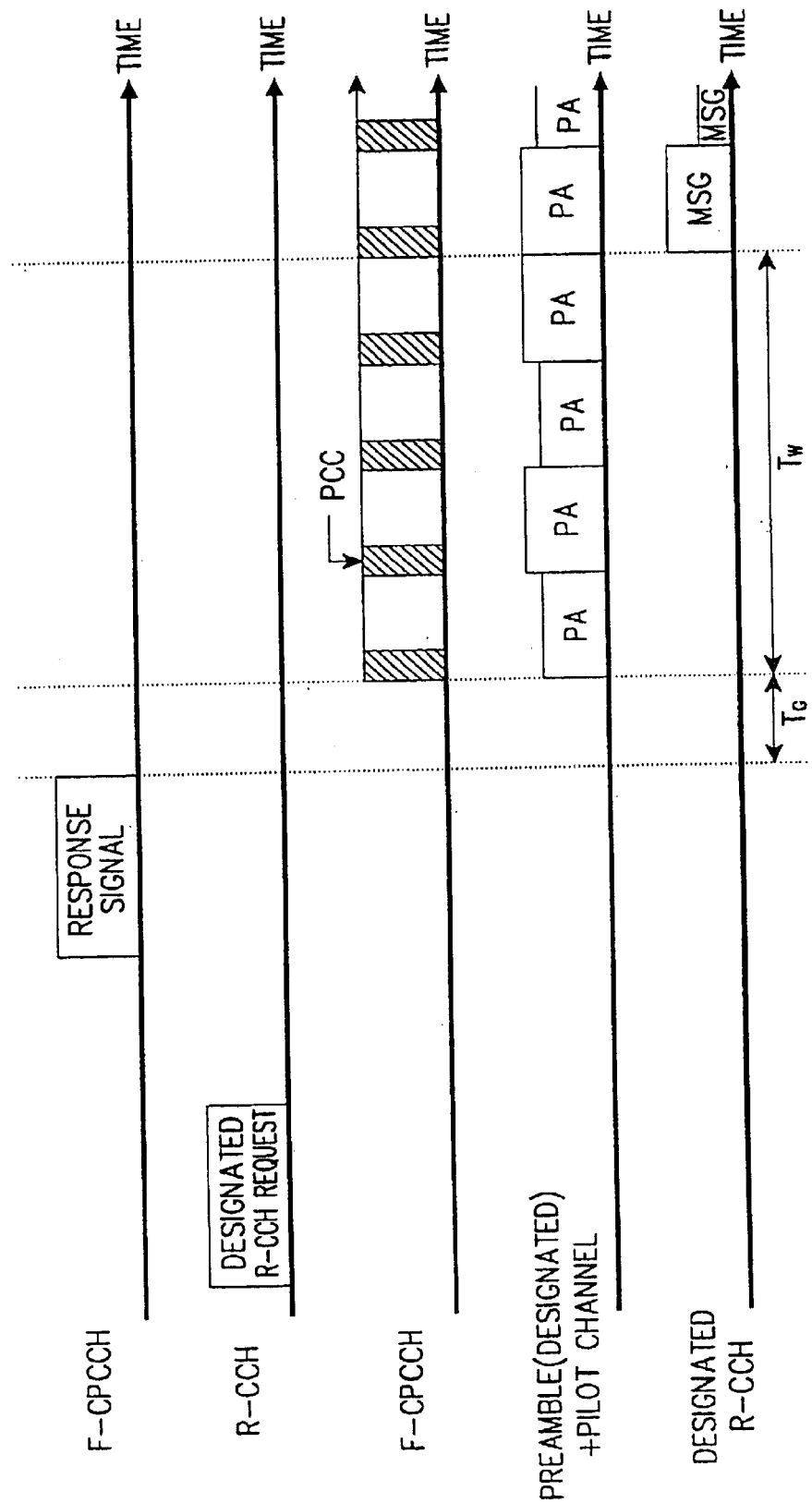

FIGS. 10A and 10B illustrate the power control procedures when the base station designates the common channel for the reverse link at the request of the mobile station and the mobile station sends a message by power controlling this designated reverse link common channel. The power control can be performed as described with reference to FIGS. 8A and 8B.

In FIGS. 8A through 10B, the non-designated channels among the reverse link common channels are assumed to operate in the slotted Aloha mode as in the IS-95 standard. Further, the base station sends the power control command to the mobile station via the forward common power control channel. In the figures, the signals transmitted via the respective channels are represented with respect to the time. FIGS. 8A, 9A and 10A correspond to the case where the reverse link does not use the pilot channel, and FIGS. 8B, 9B and 10B correspond to the case where the reverse link uses the pilot channel. In the latter figures, the transmission power of the power controlled reverse link common channel is represented by the height of the transmission signal, where the mobile station controls the initial power by transmitting the preamble signal.

As stated above, if the base station outputs the power control commands for the respective subscribers via the common power control channel for the forward link, the mobile stations control the transmission power of the reverse link according to the power control commands received via the common power control channel. In most cases, the mobile stations may receive a message or a control command via the data (or traffic) channel, in addition to the power control commands.

Further, in some cases, the mobile stations should monitor the forward common channel during transmission of the reverse link common channel, to receive the control message in addition to the common control channel for the reverse link. This case will now be described by way of example. Here, as stated above, a device for controlling the power control command of the common power control channel and receiving the forward data channel can be implemented in the separate receiver or the shared receiver. The separate receiver sends the power control command by independently operating the common power control channel, the traffic channel and the control channel. The separate receiver should include a separate despreader for independently demodulating information on the traffic channel, the control channel and the common power control channel. In the meantime, the shared receiver demodulates the power control command on the common power control channel and the corresponding channel information using one despreader.

Figure 11:
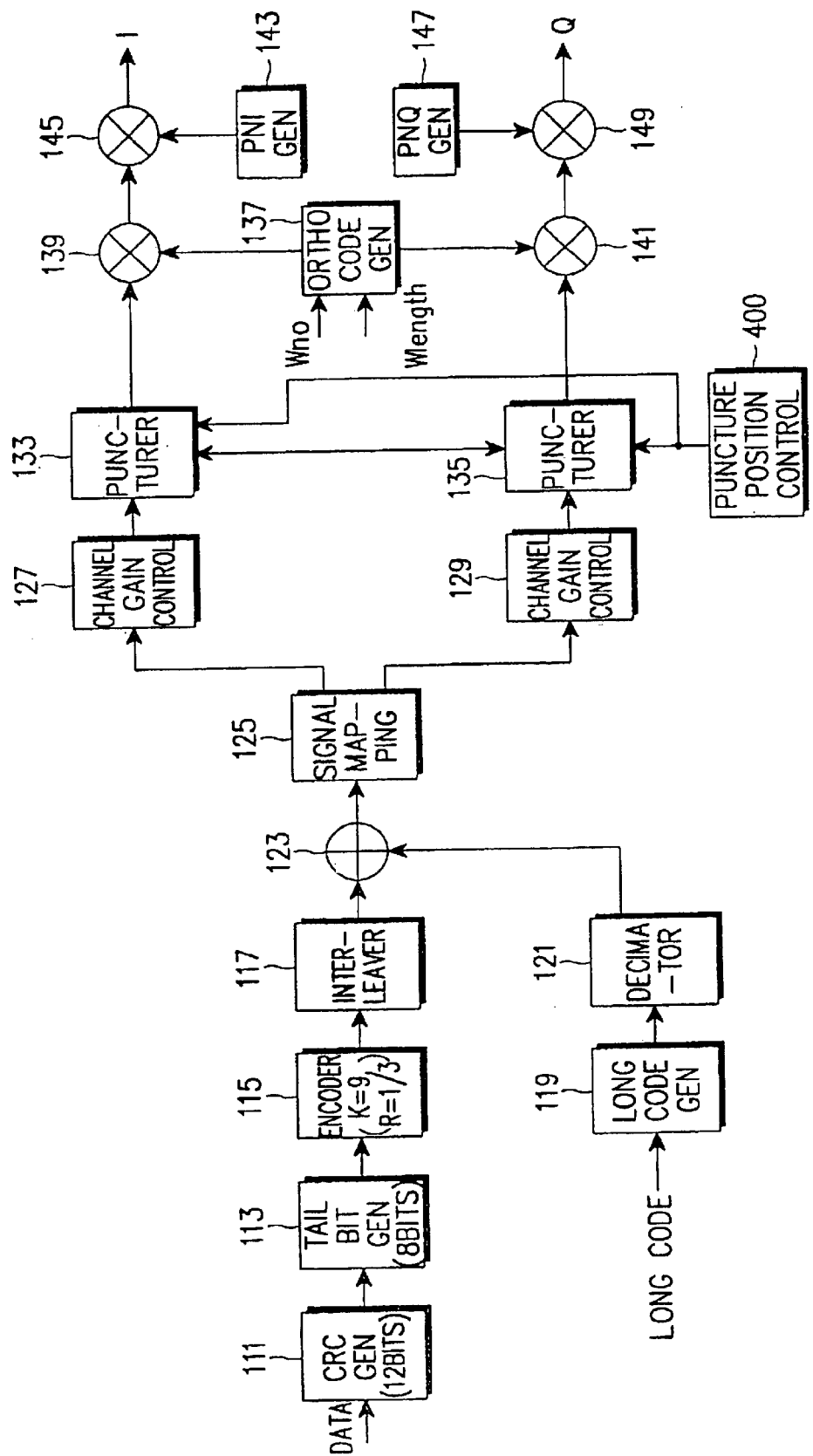
FIG. 11 is a block diagram illustrating a subscriber channel transmitter for transmitting data in association with the common power control channel in a CDMA communication system according to an embodiment of the present invention.
Figure 12:
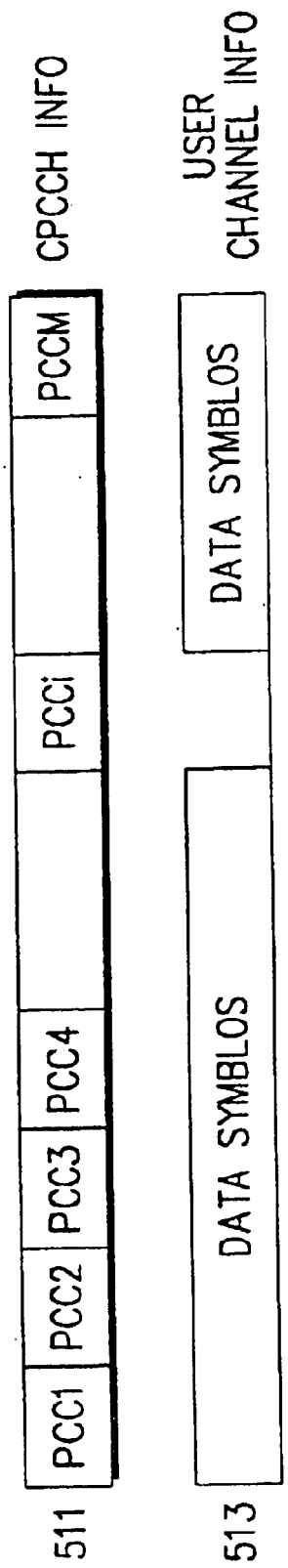
FIG. 12 is a diagram illustrating the relationship between subscriber channel information and the power control commands output from the common power control channel transmitter of FIG. 6 and the channel transmitter of FIG. 11.
Figure 13:
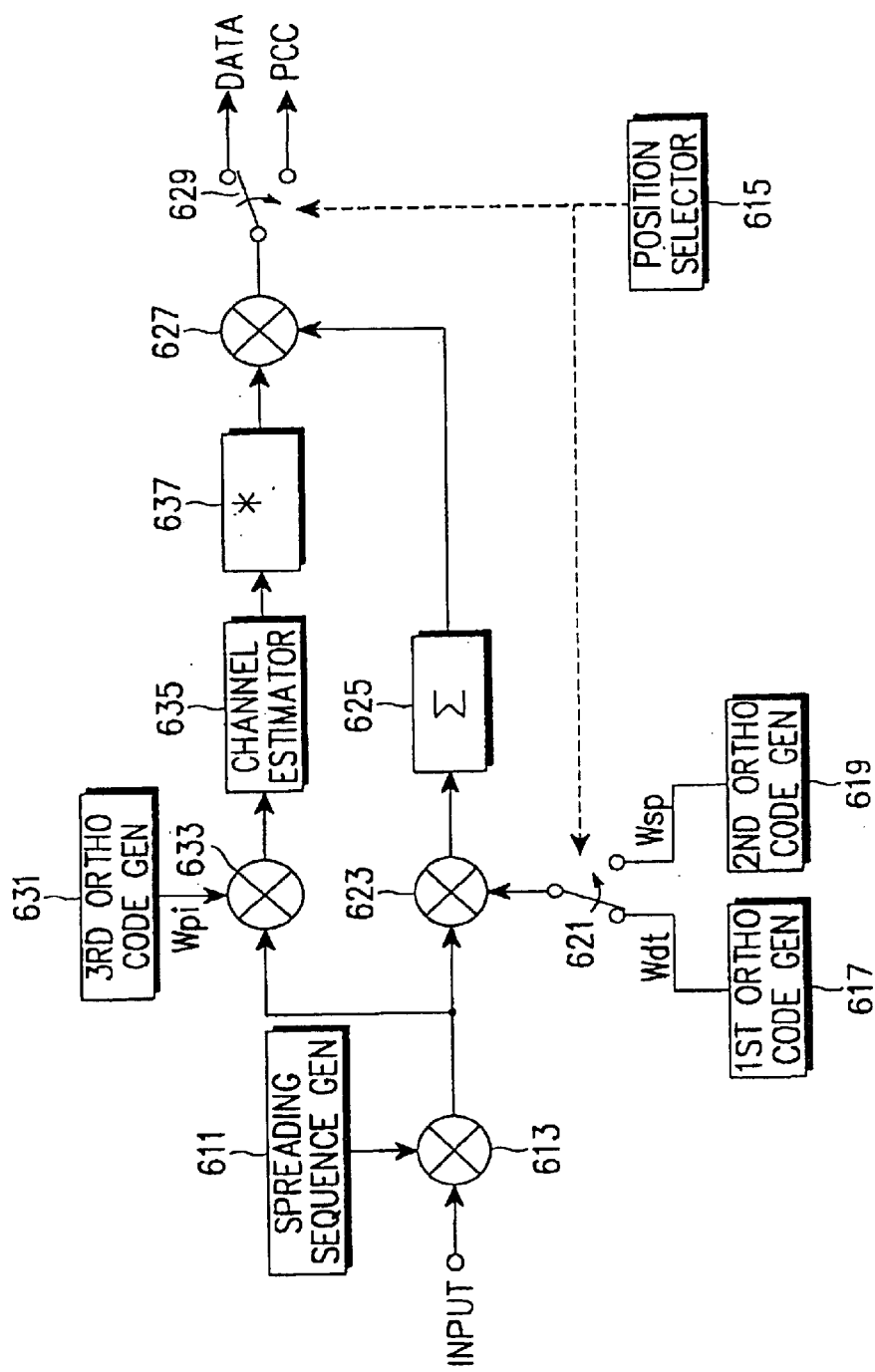
FIG. 13 is a block diagram illustrating a subscriber channel receiver for receiving the power control commands in a CDMA communication system according to the present invention.

FIG. 11 illustrates the forward data channel transmitter for transmitting the channel information in association with the common power control channel transmitter according to the present invention. FIG. 12 is a diagram illustrating the relationship between subscriber channel information and the power control commands output from the common power control channel transmitter of FIG. 6 and the channel transmitter of FIG. 11. FIG. 13 is a block diagram illustrating a structure of the mobile station for receiving the forward link data channel of FIG. 11.

Figure 14:
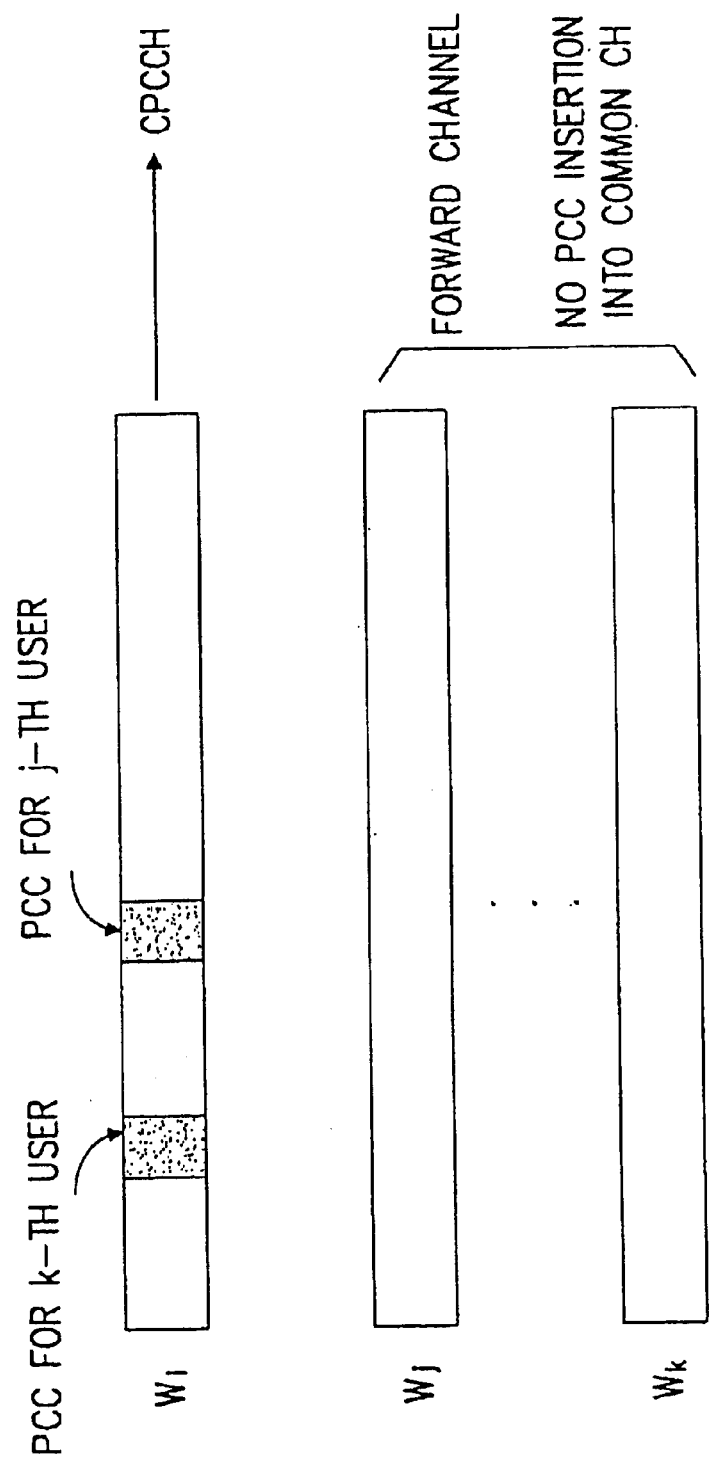
FIG. 14 is a diagram illustrating states of different common channels for the forward link in a case where a base station channel transmitter transmits the power control commands via the common power control channel.

FIG. 14 illustrates a forward common power control channel in which the forward data channel is not punctured at the position where the power control command is transmitted to the mobile station. Operations of the shared receiver and the separate receiver will be described with reference to FIGS. 15 and 16, respectively. Here, the shared receiver of FIG. 13 and the separate receiver of FIG. 17 are used.

Referring to FIG. 11, a CRC generator 111 generates 12 CRC bits and adds them to the input frame data. A tail bit generator 113 generates 8 tail bits for representing termination of one frame and adds them to the frame data output from the CRC generator 111. An encoder 115 encodes the frame data output from the tail bit generator 113. A convolutional encoder or a turbo encoder may be used for the encoder 115. An interleaver 117 interleaves the encoded bits (i.e., symbols) output from the encoder 115. A block interleaver can be used for the interleaver 117.

A long code generator 119 generates a long code for use in scrambling user information. Here, the long code is a unique user identification code and corresponds to the user's PN sequence in the transmitter. A decimator 121 decimates the long code to match a rate of the symbols output from the interleaver 117 to a rate of the long code. An XOR gate 123 XORs the encoded symbols output from the interleaver 117 and the decimated long code.

A demultiplexing and signal power mapping part 125 demultiplexes the data output from the XOR gate 123 into I-channel (i.e., first channel) data and Q-channel (i.e., second channel) data, and maps signal levels of the symbol data by converting data of "0" to "+1" and data of "1" to "−1". A channel gain controller 127 receives the first channel data and controls a gain of the received first channel data according to a gain control signal. A channel gain controller 129 receives the second channel data and control a gain of the received second channel data according to a gain control signal.

A puncture position controller 400 generates a puncture position control signal for puncturing the symbols on the traffic channel corresponding to the slot positions into which the power control commands for the corresponding subscriber are inserted. The puncture position controller 400 generates the puncture position control signal in the same manner as the slot controller 340 of FIG. 6. The puncture position control signal is generated for a symbol data duration of one frame based on the slot hopping pattern look-up table of FIG. 5B.

A first puncturer 133 receives the data symbols output from the channel gain controller 127 and punctures (or deletes) the data symbols according to the puncture position control signal output from the puncture position controller 400. A second puncturer 135 receives the data symbols output from the channel gain controller 129 and punctures the data symbols according to the puncture position control signal output from the puncture position controller 400. That is, the puncturers 133 and 135 receive the data symbols output from the channel gain controllers 127 and 129, and puncture the data symbols located at the positions corresponding to the puncture position control signal output from the puncture position controller 400. As a result, the puncturers 133 and 135 output the first and second channel symbol data, with the symbols located at the time slots for the power control commands being punctured.

An orthogonal code generator 137 generates an orthogonal code according to a Walsh code number Wno and a Walsh code length Wlength. A multiplier 139 multiplies the first channel data symbols output from the first puncturer 133 by the orthogonal code to generate an orthogonally modulated signal for the first channel. A multiplier 141 multiplies the second channel data symbols output from the second puncturer 135 by the orthogonal code to generate an orthogonally modulated signal for the second channel. A PNI generator 143 generates a PN sequence PNI for the first channel (i.e., I-channel). A multiplier 145 multiplies the orthogonal modulation signal output from the multiplier 139 by the PNI sequence to generate a spread signal for the first channel. A PNQ generator 147 generates a PN sequence PNQ for the second channel (i.e., Q-channel). A multiplier 149 multiplies the orthogonal modulation signal output from the multiplier 141 by the PNQ sequence to generate a spread signal for the second channel.

For the convenience of explanation, it will be assumed that a fundamental channel receiver not only demodulates input data but also receives the power control commands transmitted via the common power control channel. In this case, the channel transmitter structured as shown in FIG. 11 becomes a fundamental channel transmitter.

In operation, the CRC generator 111 adds the CRC bits to the input frame data to enable a receiver to determine a quality of the frame. When one frame has a length of 172 bits, the CRC generator 111 generates 12 CRC bits and adds them to the input frame data. The CRC bit-added frame data is applied to the tail bit generator 113 which generates 8 tail bits per frame and adds them to the CRC bit-added frame data. The tail bits are used to represent termination of one frame and serve to initialize the encoder 115 at the following stage of the tail bit generator 113. It is assumed that the encoder 115 used in the embodiment is a convolutional encoder having a constraint length, K=9, and a coding rate, R=⅓. In this case, the encoder 115 encodes 192 bits per frame into 576 symbols per frame. The interleaver 117 receives 576 symbols per frame output from the encoder 115 and rearranges the bits within the frame by the frame unit to increase a tolerance for the burst error.

The decimator 121 decimates the long code output from the long code generator 119 to match a rate of the long code to that of the symbols output from the interleaver 117. The XOR gate 123 XORs the interleaved signal and the decimated long code to scramble the interleaved signal.

The demultiplexing and signal power mapping part 125 demultiplexes the symbols output form the XOR gate 123 to output the odd-numbered symbols to the first channel and the even-numbered symbols to the second channel. Also, the demultiplexing and signal power mapping part 125 maps signal levels by converting a signal level "1" to "−1" and a signal level "0" to "+1". The channel gain controllers 127 and 129 control gains of the symbols for the first and second channels, respectively.

The puncturers 133 and 135 then puncture the symbols located at the positions of the power control commands on the common power control channel, under the control of the puncture position controller 400. That is, the puncture position controller 400 designates the symbol puncture positions corresponding to the positions of the power control commands for the corresponding subscriber on the common power control channel, in the same manner as the slot controller 340 of FIG. 6. The puncturers 133 and 135 then puncture the designated symbols for the first and second channels, respectively.

FIG. 12, as indicated above, illustrates a relationship between the power control commands output from the common power control channel transmitter of FIG. 6, the channel transmitter of FIG. 11, and the fundamental channel (user channel) information. Reference numeral 511 represents a common power control channel having M power control commands PCC1–PCCM for M subscribers, wherein PCCi represents the power control command for i-th subscriber. Further, reference numeral 513 represents a fundamental channel in which a symbol corresponding to the power control command PCCi is deleted (i.e., punctured).

Turning back to FIG. 11, after puncturing is performed by the puncturers 133 and 135, the multiplier 139 multiplies the symbols output from the puncture 133 by the orthogonal code output from the orthogonal code generator 137 to generate orthogonally modulated transmission signals for the first channel. The multiplier 141 multiplies the symbols output from the puncture 135 by the orthogonal code output from the orthogonal code generator 137 to generate orthogonally modulated transmission signals for the second channel. The orthogonal code used in the channel transmitter is a Walsh code or a quasi-orthogonal code. In addition, the multipliers 145 and 149 multiply the orthogonally modulated signals for the first and second channels by the PN sequences PNI and PNQ, respectively, to spread the orthogonally modulated signals.

FIG. 13, as indicated above, is a block diagram illustrating the subscriber channel receiver for receiving the power control commands. A spreading sequence generator 611 generates a spreading sequence for despreading a received spread signal. A PN sequence can be used for the spreading sequence. A multiplier 613 multiplies the input spread signal by the spreading sequence to despread the input spread signal.

A PCC bit position selector 615 generates a position select signal for selecting a slot into which the power control command for the corresponding subscriber is inserted. A first orthogonal code generator 617 generates an orthogonal code Wdt assigned to the traffic channel for the corresponding subscriber, and a second orthogonal code generator 619 generates an orthogonal code Wsp assigned to the common power control channel.

The orthogonal code Wsp generated from the second orthogonal code generator 619 is assigned in common to several subscribers receiving the power control commands transmitted via the common power control channel for the forward link. A switch 621 selects the orthogonal code Wdt or the orthogonal code Wsp according to the position select signal output from the PCC bit position selector 615. A multiplier 623 multiplies the despread signal output from the multiplier 613 by the orthogonal code selected in the switch 621, to demodulate the orthogonally modulated signal. An accumulator 625 accumulates an output of the multiplier 623. This structure corresponds to a subscriber channel receiver associated with the common power control channel.

A third orthogonal code generator 631 generates an orthogonal code Wpi for the pilot channel. A multiplier 633 multiplies an output of the multiplier 613 by the orthogonal code Wpi for the pilot channel to generate a pilot channel signal. A channel estimator 635 estimates an energy of the pilot signal by receiving an output of the multiplier 633. A complex conjugator 637 calculates a complex conjugate by receiving an output of the channel estimator 635. This structure corresponds to a pilot channel receiver.

A multiplier 627 multiplies an output of the complex conjugator 637 by an output of the accumulator 625. A switch 629 switches an output of the multiplier 627 to the data channel or the power control channel according to the position select signal from the PCC bit position selector 615.

In operation, the subscriber channel receiver structured as described above receives information on both the corresponding subscriber channel and the common power control channel. The multiplier 613 despreads the received signal which was spread during transmission, by multiplying the received signal by the spreading sequence generated from the spreading sequence generator 611. The despread signal is again multiplied in the multiplier 633 by the orthogonal code Wpi for the pilot channel. In this way, the multiplier 633 extracts the pilot channel signal from the receive signal. The channel estimator 635 estimates the pilot channel signal to determine the pilot channel condition. The estimated pilot channel signal is applied to the multiplier 627 through the complex conjugator 637. In doing so, the pilot channel signal is demodulated in the same way as in a conventional pilot channel receiver.

The subscriber channel receiver receives positional information about the slot into which the power control command for the corresponding subscriber is inserted and orthogonal code information about the common power control channel. The PCC bit position selector 615 stores the slot hopping pattern look-up table shown by FIG. 5B. Therefore, the PCC bit position selector 615 can detect the slot into which the power control command for the corresponding subscriber is inserted, based on the received positional information and the look-up table. In other words, it is possible to detect the position of the symbol punctured as shown in FIG. 12.

The PCC bit position selector 615 generates the position select signal for controlling the switches 621 and 629 at the position of the punctured symbol. The switch 621 is normally connected to an output node of the first orthogonal code generator 617, and is switched to an output node of the second orthogonal code generator 619 in response to the position select signal generated from the PCC bit position selector 615. Similarly, the switch 629 is normally connected to an input node of a data combiner (not shown), and is switched to an input node of a power control command combiner (not shown) in response to the position select signal generated from the PCC bit position selector 615.

As a result, for the symbol data processing interval, the despread signal output from the multiplier 613 is multiplied in the multiplier 623 by the first orthogonal code Wdt to be demodulated, and then accumulated in the accumulator 625. The output of the accumulator 625 is compensated in the multiplier 627 and then applied to the data combiner via the switch 629. During the symbol data processing, if the PCC bit position selector 615 generates the position select signal, the switch 621 is switched to the output node of the second orthogonal code generator 619 and the switch 629 is switched to the input node of the power control command combiner. As a result, the power control command for the corresponding subscriber is multiplied in the multiplier 623 by the second orthogonal code Wsp to be demodulated, and then applied to the power control command combiner via the accumulator 625, the multiplier 627, and the switch 629.

In sum, the subscriber channel receiver generates two separate orthogonal codes: one for demodulating the subscriber channel information and another for demodulating the power control command. That is, the subscriber channel receiver selects the orthogonal code for the subscriber channel to demodulate the symbol data, and selects the orthogonal code for the common power control channel to demodulate the power control command. Here, since the symbol on the subscriber channel located at the position corresponding to the power control command for the subscriber is punctured, there is no influence of the symbols in demodulating the power control command at the receiver.

FIG. 14 shows an example of the base station sending different forward data channels while transmitting the power control commands using the common power control channel. In this example, the forward data channels are the forward link common channels (e.g., a traffic channel or a control channel) and the power control commands are inserted into the separate common power control channel rather than the forward link common channels. Unlike the structure of FIG. 11, the symbols on the forward data channels are not punctured when the power control commands are transmitted to the respective subscribers via the common power control channel.

Figure 15:
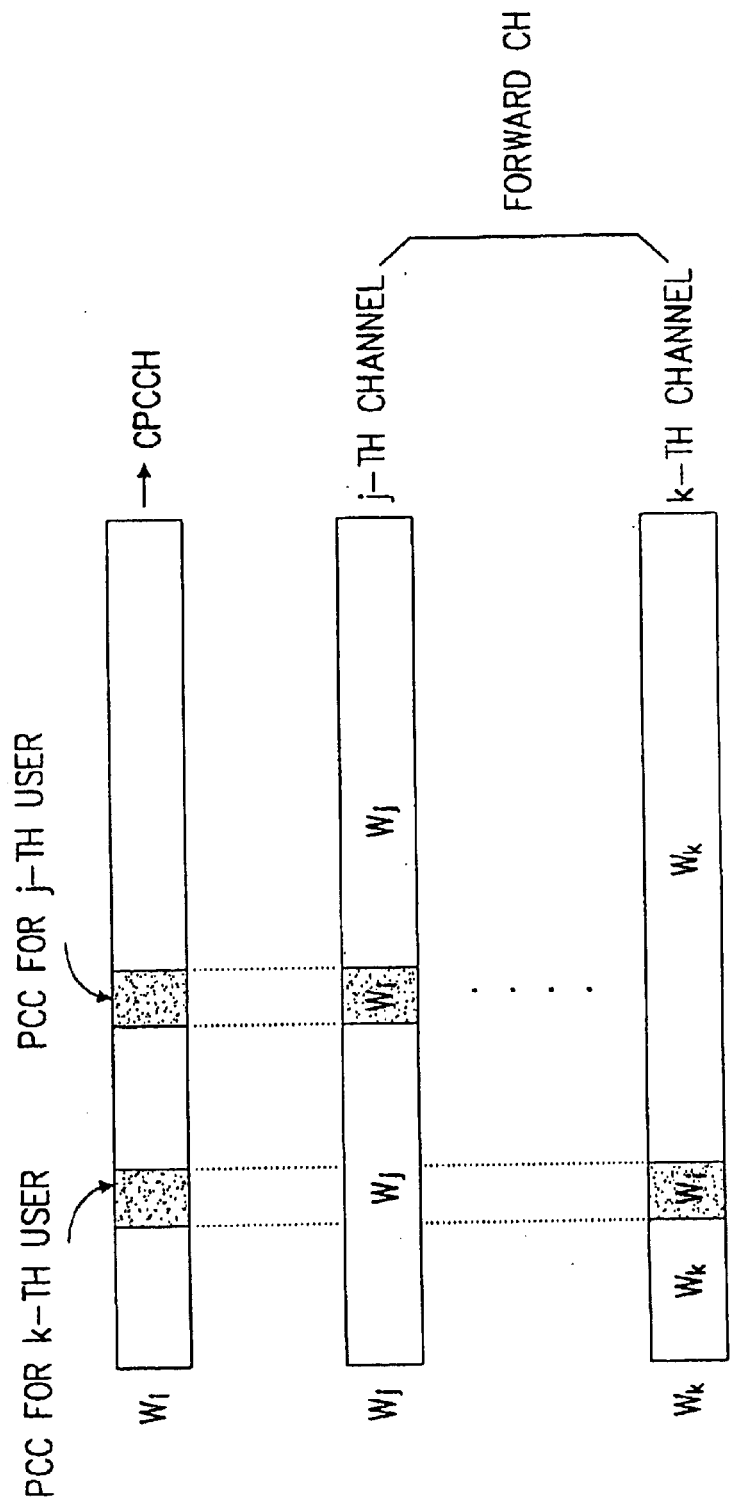
FIGS. 15 and 16 illustrate cases where the base station transmits the power control commands using the common power control channel and the mobile stations receive the power control commands transmitted.
Figure 16:
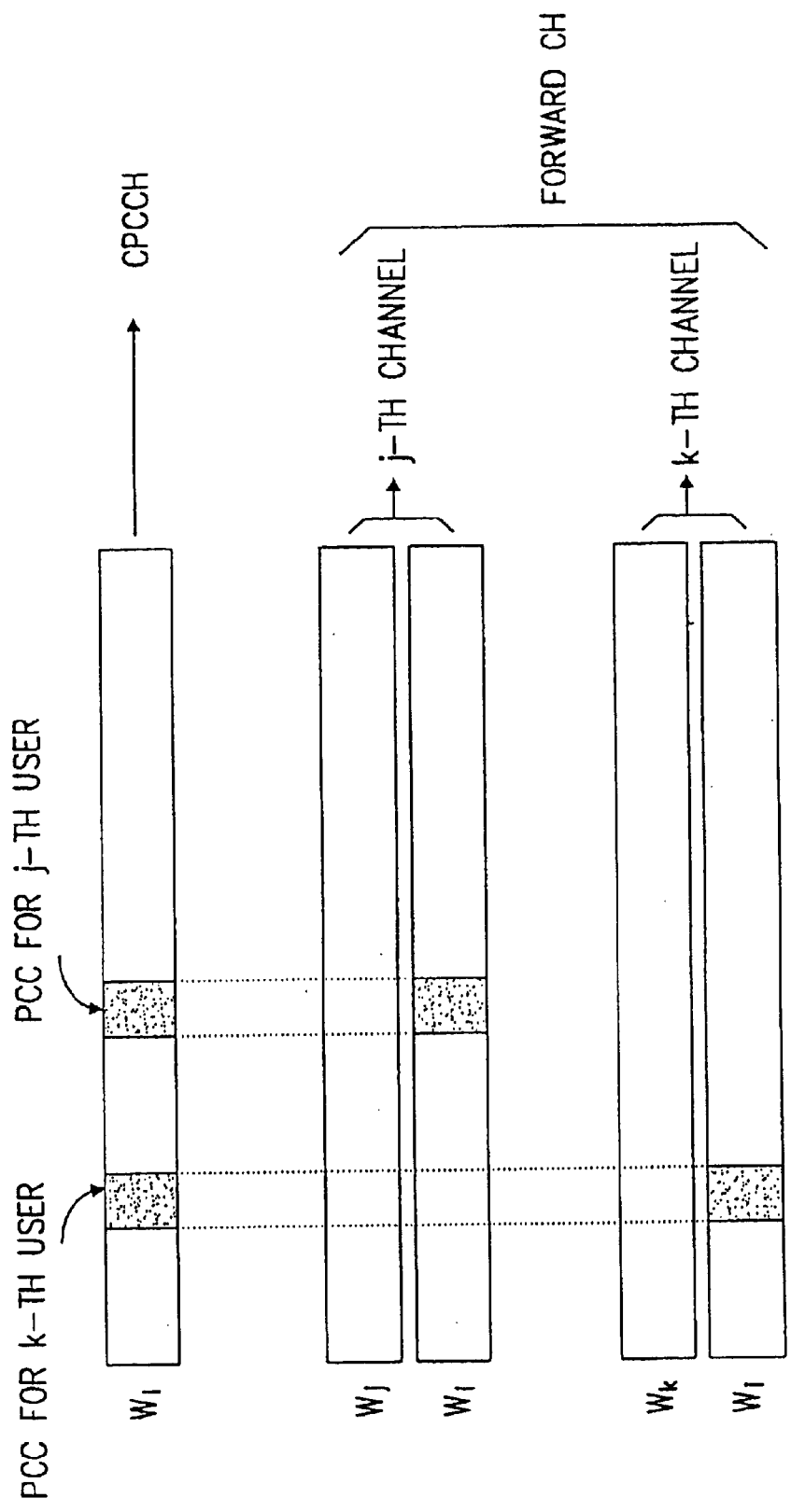
Figure 17:
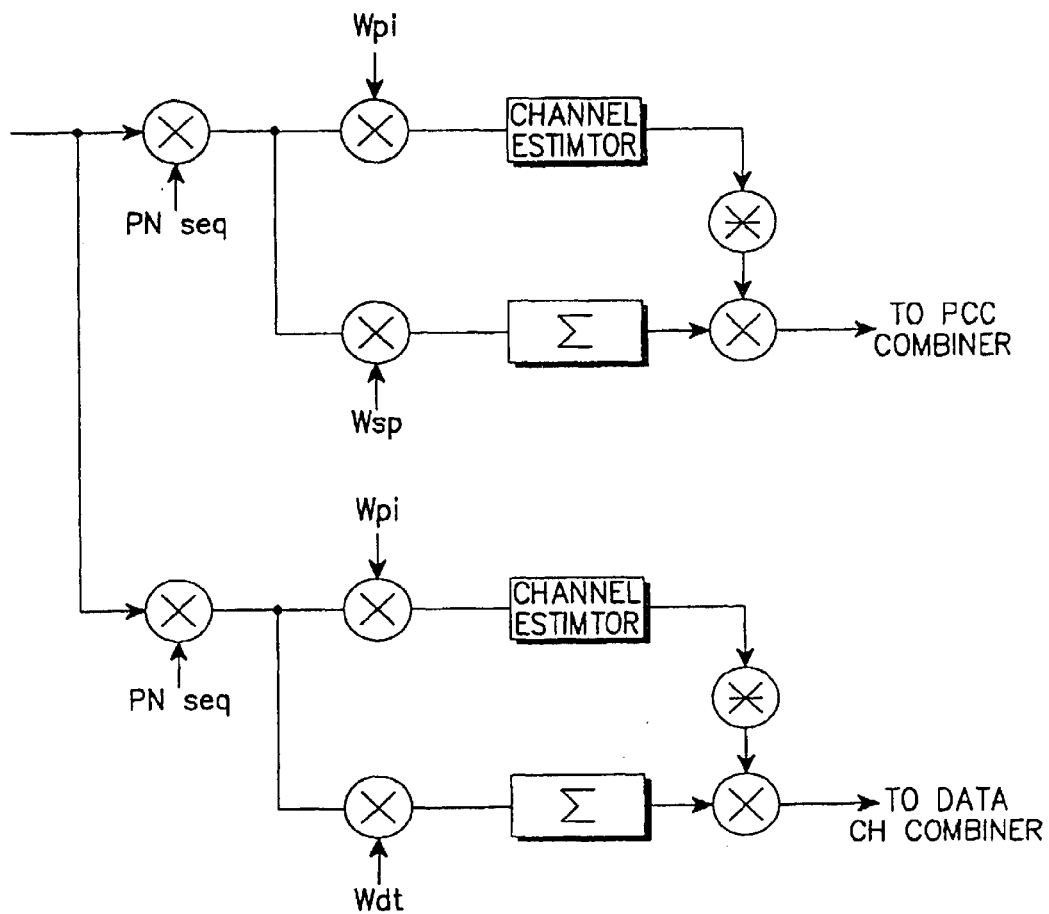
FIG. 17 is a block diagram illustrating a mobile station for simultaneously receiving the common power control channel and the forward traffic channel in the manner as shown in FIG. 16.

FIGS. 15 and 16 show different examples of the mobile station simultaneously receiving, from the base station, a control message via the forward link common channels and a power control command via the common power control channel.

In FIG. 15, the mobile station receives both messages via different forward link common channels and the power control command via the common power control channel using one channel receiver. In order to use the common power control channel, the base station sends, to the mobile station, a Walsh code number for the common power control channel to be used and information about the position of the power control command (hereinafter, referred to as "common power control channel information"). However, if the slot position is determined in a pseudo-random method commonly known to the mobile station and the base station, it is not necessary to send the information representing the position of the power control command (or a power control bit). Based on the common power control channel information, the mobile stations (e.g., j-th to k-th mobile stations) can know their own Walsh codes and the positions where the power control commands for themselves are located.

The channel receiver in each mobile station receives the message transmitted via the forward common control channel using the assigned Walsh code (Wj or Wk), and after a lapse of a predefined time, receives the power control command using the Walsh code Wi assigned for the common power control channel. After reception of the power control command, the channel receiver receives the message on the forward common channel using the previously used Walsh code (Wj or Wk). Since the mobile station receives the message on the forward common control channel and the power control command on the common power control channel using a single channel receiver, it cannot receive the message symbol transmitted via the forward common control channel while receiving the power control command, thereby obtaining the result of puncturing the power control command into the forward common control channel.

However, when the power control command is added to the traffic channel as is the case in the prior art, one separate Walsh code should be continuously assigned for transmission of the power control command, even when there is no message to be transmitted via the traffic channel, thereby resulting in a waste of the Walsh code resources. In the embodiment of the present invention, however, with use of the common power control channel, it is possible to release the assigned Walsh code (Wj or Wk) when there is no message to transmit and receive the power control command at a predefined position using the Walsh code Wi, thereby efficiently utilizing the Walsh code resources for the forward link.

In FIG. 16, each mobile station receives the messages via different forward link common control channels using two channel receivers and receives the power control command via the common power control channel. Unlike the case of FIG. 15, since the mobile station has two channel receivers, it can receive the message symbols transmitted via the forward link common control channels even while receiving the power control command. As a result, it is possible to prevent the channel degradation which may occur in the case where the symbols on the forward common control channel are partially punctured to insert therein the power control commands.

FIG. 17 is a block diagram illustrating a mobile station structure for simultaneously receiving the common power control channel and the forward data channel in the same manner as shown by FIG. 16.

Figure 18A:
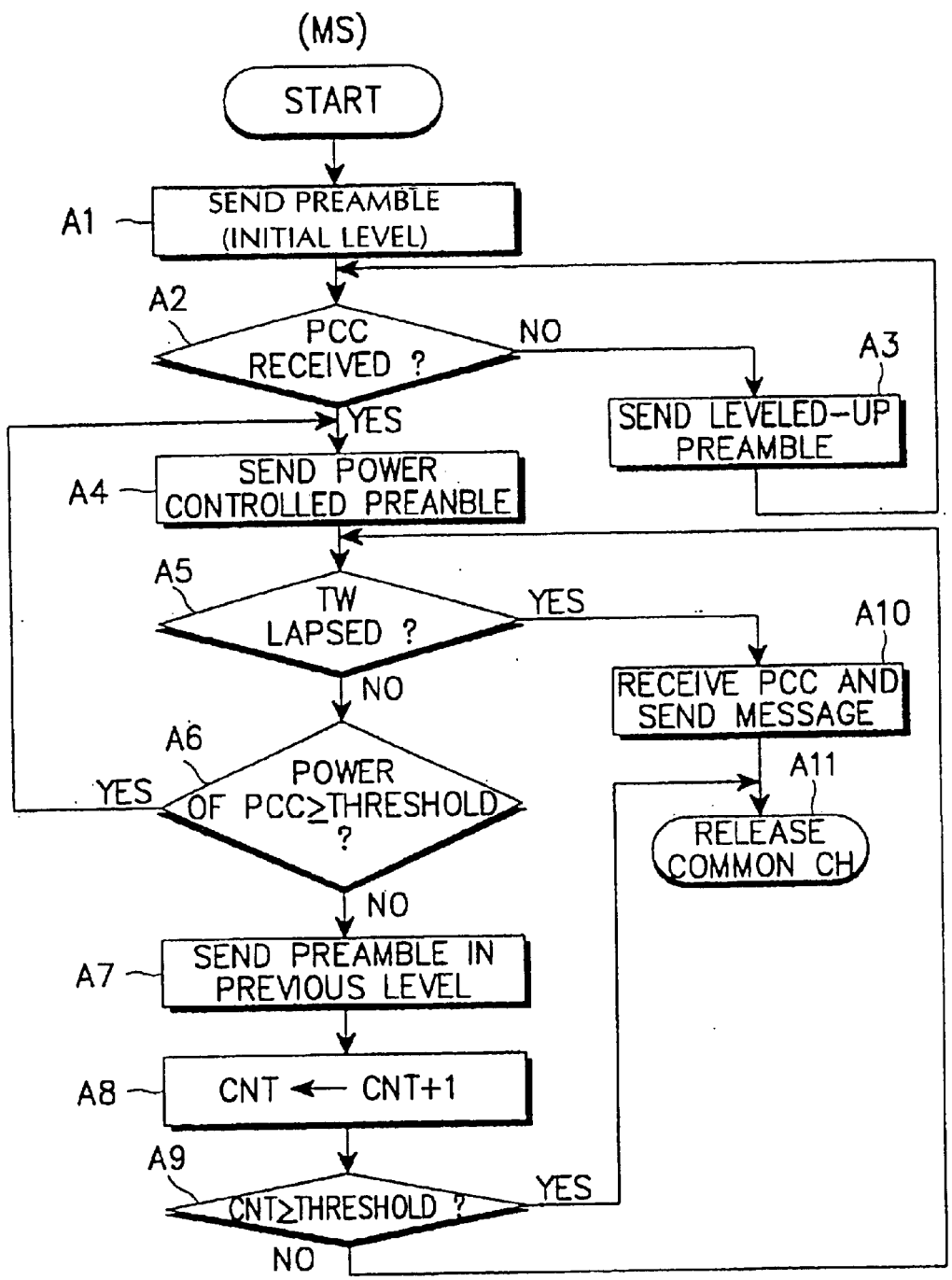
FIGS. 18A and 18B are flow charts illustrating operations of the base station and the mobile station when a message is transmitted by power controlling the reverse link common channel in accordance with the present invention.
Figure 18B:
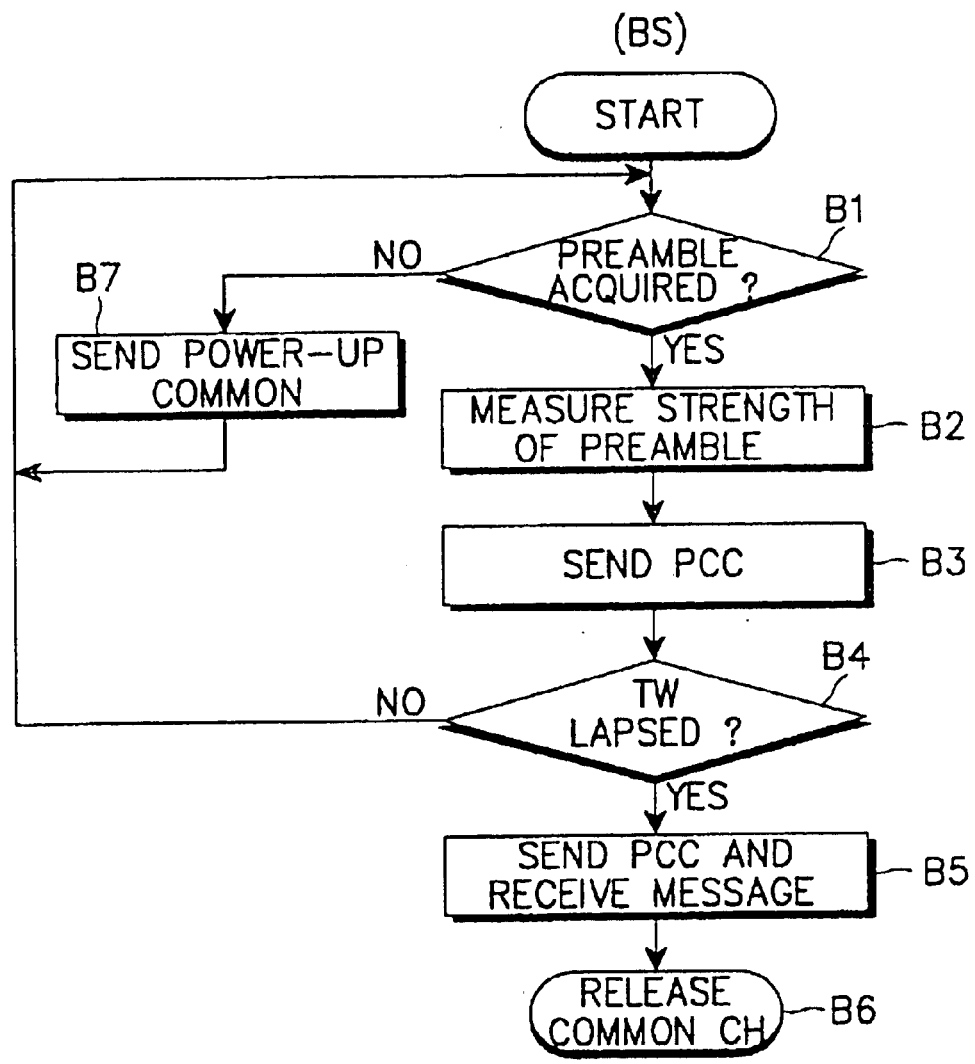

FIGS. 18A and 18B are flow charts illustrating operations of the base station and the mobile station when a message is transmitted by power controlling the reverse link common channel according to the methodology of the present invention. In this embodiment, the mobile station and the base station control the initial power using the preamble signal that the mobile station transmits for a predefined time TW, prior to transmitting an actual message signal.

Referring to FIG. 18A, in step A1, the mobile station (MS) transmits a preamble signal of an initial level to the base station via the common channel for the reverse link. The mobile station checks in step A2 whether a power control command is received from the base station via the common channel for the forward link. Upon failure to receive the power control command, the mobile station increases in step A3 the level (i.e., power) of the preamble signal by a predefined amount, on the belief that the base station failed to acknowledge the preamble signal due to the signal's low transmission power. Thereafter, the procedure returns to step A2.

However, in the event where it is predetermined between the mobile station and the base station that the power control command is transmitted at a predefined time via the forward link, step A3 may be omitted. Upon reception of the power control command from the base station, the mobile station in step A4 controls the level of the preamble signal according to the received power control command and transmits the power controlled preamble signal to the base station.

After transmitting the power controlled preamble signal, the mobile station proceeds to step A5 to see if a predefined time TW has elapsed. When the predefined time TW has not elapsed yet, the mobile station compares the power of the received power control command with a threshold value, in step A6. When the power of the received power control command is equal to higher than the threshold value, the mobile station returns to step A4 and continues to transmit the preamble signal to the base station by controlling the power of the preamble signal according to the received power control command. However, if the power of the received power control command is lower than the threshold value in step A6, the mobile station transmits in step A7 the preamble signal, maintaining the previous power level. Subsequently, in step A8, the mobile station increase a count value CNT by one. Here, the count value CNT represents how many times the mobile station has transmitted the preamble signal in the previous power level. When the count value CNT is equal to or higher than a threshold value in step A9, the mobile station releases the reverse link common channel in step A11. However, when the count value CNT is lower than the threshold value, the procedure returns to the step A5. As stated above, when the power control command is lower in power level than the threshold value for a predetermined amount of times, the mobile station releases the reverse link common channel and discontinues transmitting in belief that the power control channel for the forward link is in a bad condition. In this exemplary embodiment, the mobile station releases the reverse link common channel by checking the receiving power of the power control command during transmission of the preamble signal. Of course, however, it is also possible to release the reverse link common channel even during transmission of the message, if the power control command channel is in bad condition.

In the meantime, when the predefined time TW has elapsed in step A5, the mobile station continuously receives, in step A10, the power control command from the base station and simultaneously sends an intended message to the base station via the reverse link common channel by controlling the transmission power according to the received power control command. After transmission of the message, the reverse link common channel is released in step A11.

In FIG. 18A, the mobile station transmits the preamble signal to the base station via the reverse ink common channel prior to actually sending the message in step A10, and the base station then sends the power control command to the mobile station according to the receiving power of the preamble signal. In this manner, the initial power control is performed to adjust the power of the reverse link common channel to a desired extent. The purpose of the initial power control is to enable the mobile station to safely send the first several frames of the intended message.

Next, referring to FIG. 18B, the base station checks in step B1 whether the preamble signal is received from the mobile station. Upon failure to detect the preamble signal from the mobile station, the base station sends to the mobile station a power-up command for instructing an increase of the power for the reverse link, in step B7. This is to increase an initial acquisition probability by sending the power-up command to the mobile station in the case where the power of the reverse link is too low to receive the preamble signal. However, upon detection of the preamble signal from the mobile station, the base station measures the strength of the received preamble signal in step B2, and then sends a power control command to the mobile station according to the measurement in step B3. After that, the base station determines in step B4 whether the predefined time TW has elapsed, if not, the process returns to step B1. However, after a lapse of the predefined time TW, the mobile station receives the message sent from the mobile station in step B5 and then releases the corresponding common channel in step B6. In the meantime, the base station sends the power control command to the mobile station even while receiving the message from the mobile station, so as to enable the mobile station to control the transmission power according to the power control command.

Figure 19A:
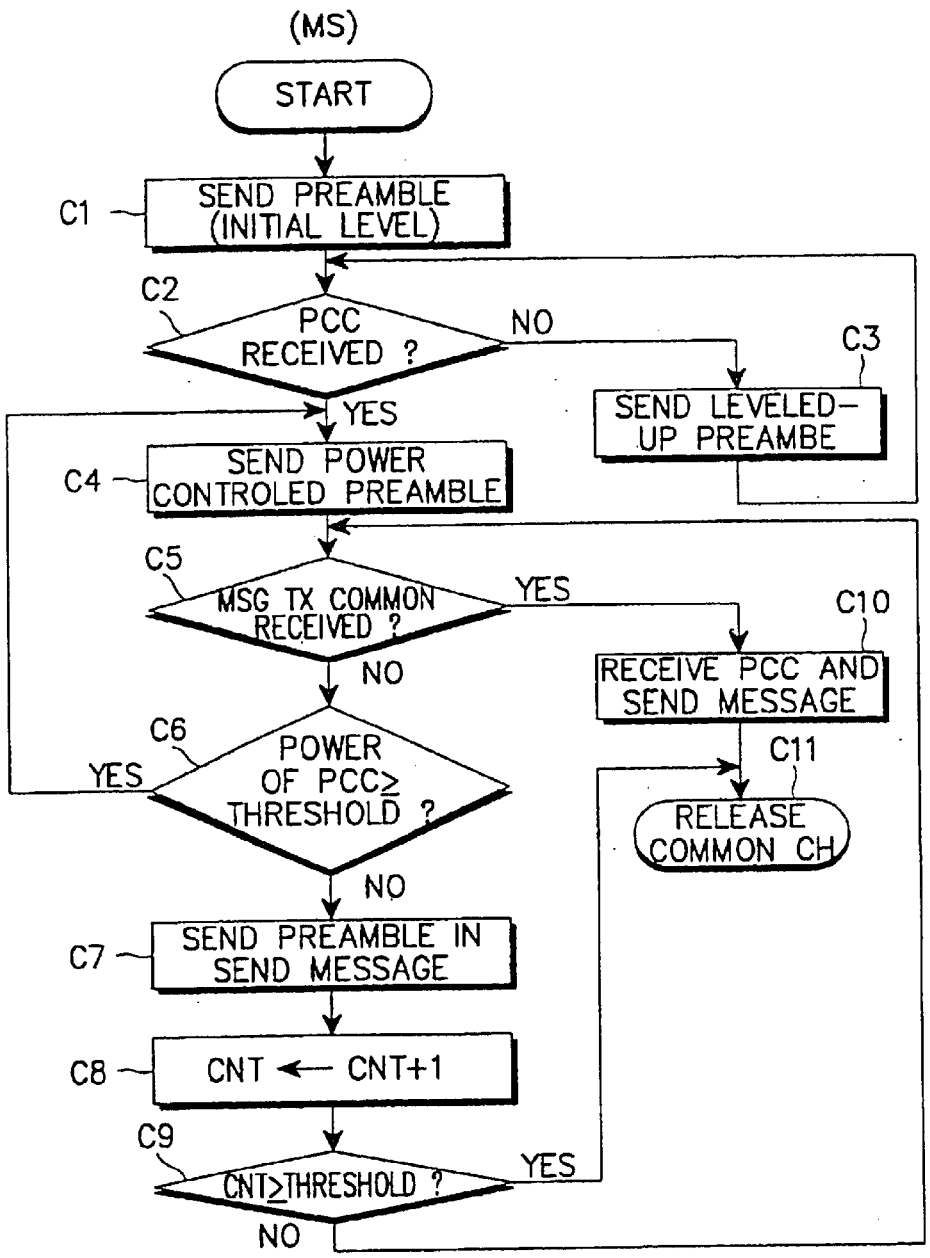
FIGS. 19A and 19B are flow charts illustrating operations of the base station and the mobile station when a message is transmitted by power controlling the reverse link common channel in accordance with the present invention.
Figure 19B:
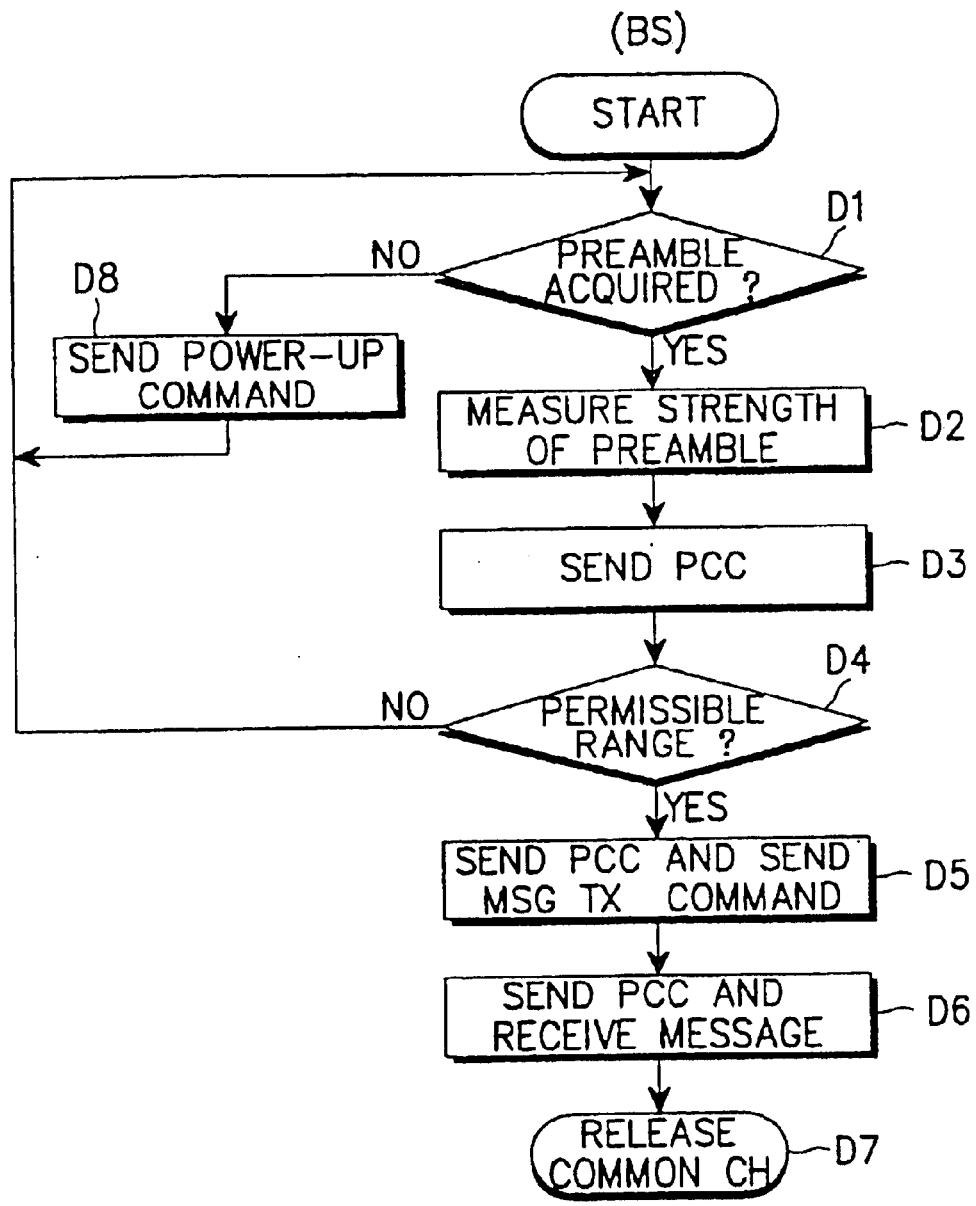

FIGS. 19A and 19B are flow charts illustrating operations of the base station and the mobile station when a message is transmitted by power controlling the common channel for the reverse link according to an embodiment of the present invention. When compared with the embodiment shown by FIGS. 18A and 18B, the embodiment of FIGS. 19A and 19B is different in that the base station informs the mobile station about a message transmission time during initial power control between the base station and the mobile station.

The procedure of FIG. 19A is equal to that of FIG. 18A except step C5 which corresponds to step A5 of FIG. 18A. In step C5, the mobile station checks whether a message transmission command is received from the base station, in order to determine whether to finish initial power control and to send the intended message.

The procedure of FIG. 19B is equal to that of FIG. 18B except that step B4 of FIG. 18B is replaced with steps D4 and D5. In step D4, the base station measures the strength (i.e., receiving power) of the preamble signal sent from the mobile station to determine whether the strength of the received preamble signal is within a permissible range. If the strength of the received preamble signal is within the permissible range, the base station sends the message transmission command to the mobile station in step D5, as well as the power control command.

Figure 20A:
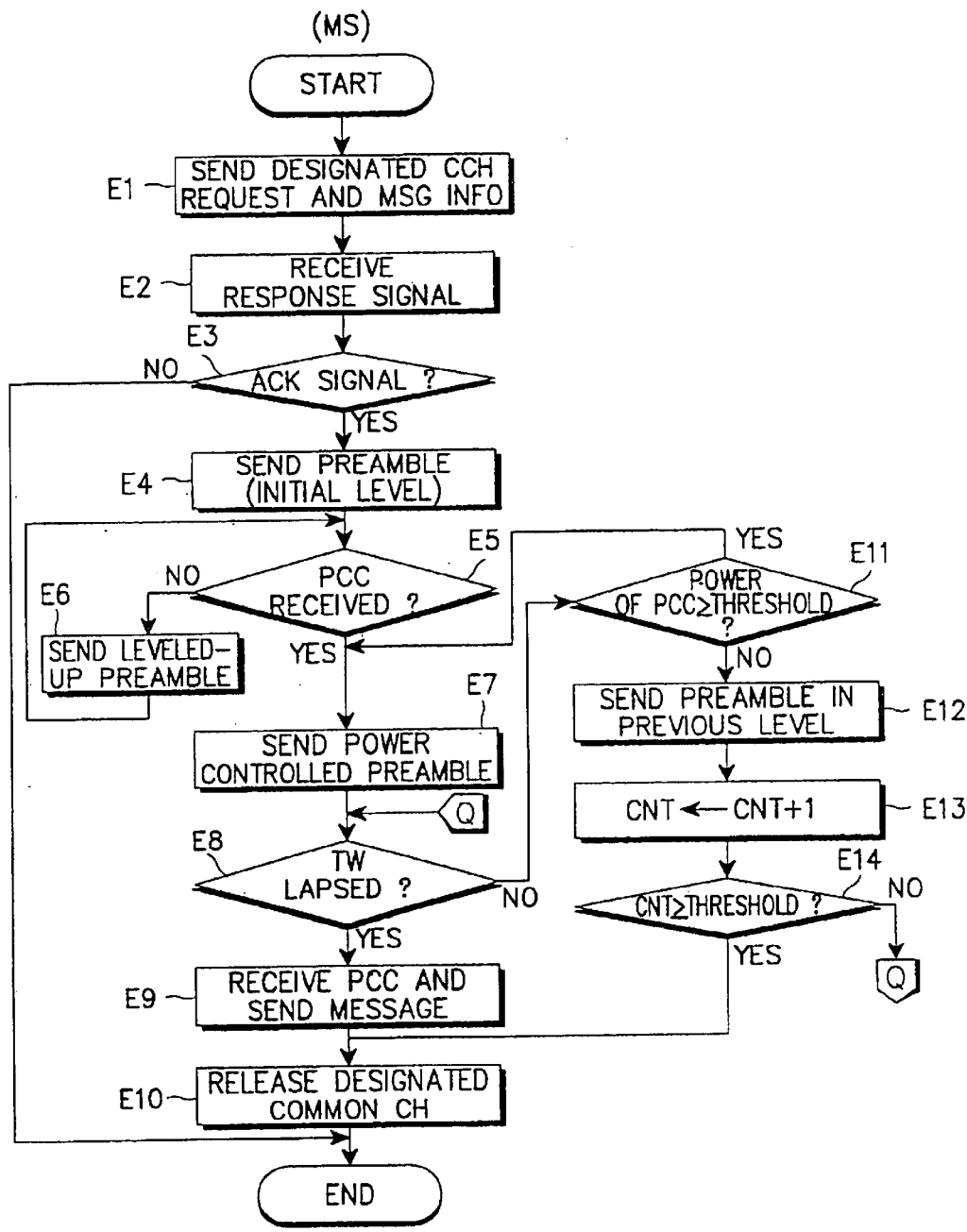
FIGS. 20A and 20B are flow charts illustrating operations of the base station and the mobile station when a message is transmitted by power controlling the designated common channel for the reverse link in accordance with an embodiment of the present invention.
Figure 20B:
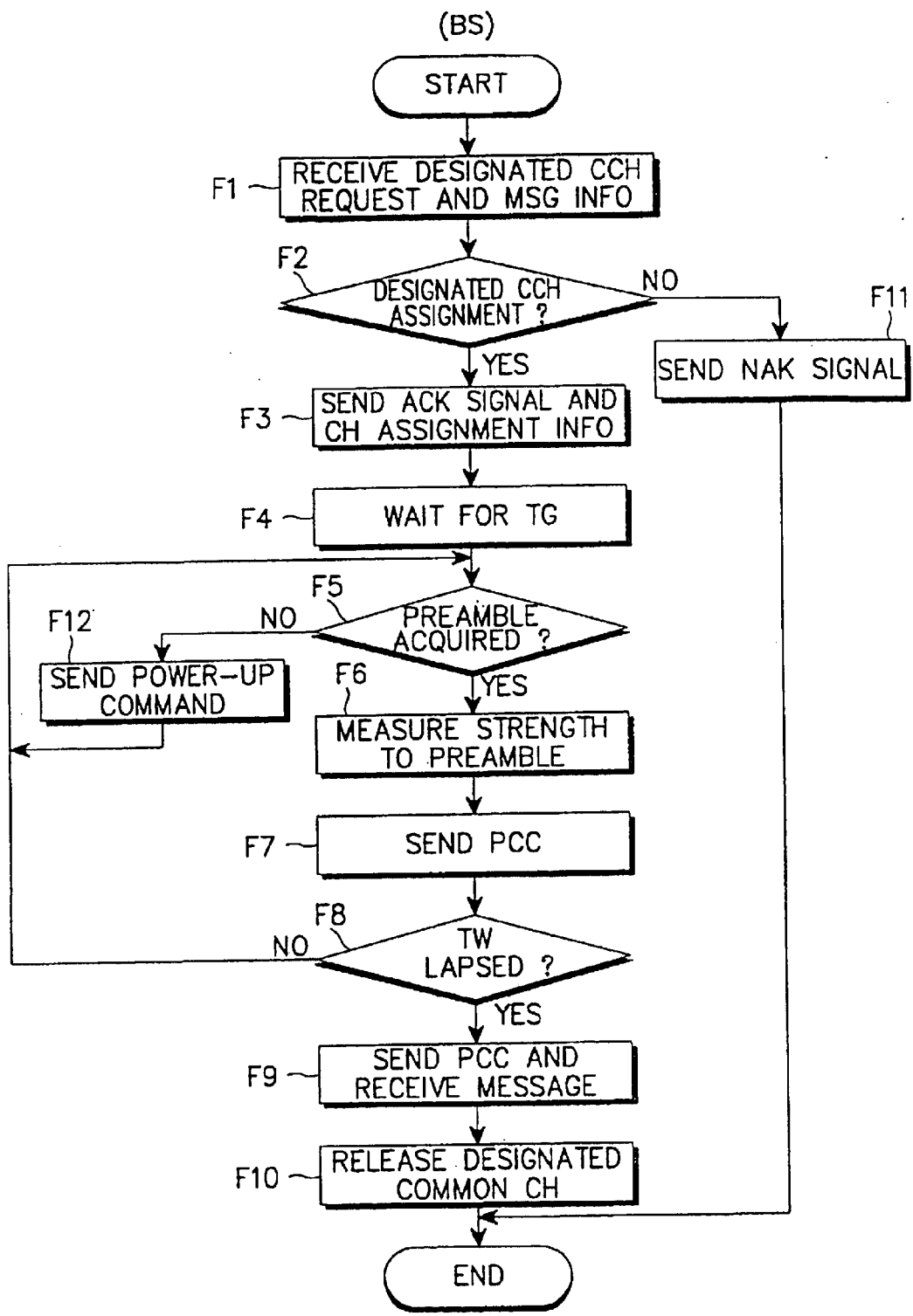

FIGS. 20A and 20B are flow charts illustrating operations of the base station and the mobile station when a message is transmitted by power controlling the designated common channel for the reverse link according to another embodiment of the present invention. Even in this embodiment, the mobile station and the base station exchange an actual message after performing initial power control during predefined time TW. However, since this embodiment performs the power control for the designated common channel only, a channel request and assignment operation for the designated common channel precedes.

Referring to FIG. 20A, in step E1, the mobile station transmits a channel request signal to the base station in order to use the designated channel. The mobile station can send information about a message to send, together with the channel request signal. The base station then analyzes the information sent from the mobile station to determine whether to use the designated reverse link common channel. When it is intended to use the designated reverse link common channel, the mobile station sends a channel assignment command and associated channel assignment information as a response signal via the forward link common channel (See steps F1, F2, F3 and F11 of FIG. 20B). The mobile station then receives the response signal in step E2, and determines is step E3 whether the response signal corresponds to an acknowledge signal ACK or a negative acknowledge signal NAK. Here, the ACK signal represents that the base station permits the mobile station to use the designated reverse link common channel, and the NACK signal represents that the base station does not permit the mobile station to use the designated reverse link common channel. Upon reception of the ACK signal, the mobile station starts sending the reverse link common channel in an initial power after a lapse of a predefined time TG. As shown in steps E4–E8 and E11–E14, after performing the initial power control for the predefined time TW, the mobile station sends the actual message. Since operations in steps E4–E9 and E11–E14 are equal to those in steps A1–A10 of FIG. 18A, the associated descriptions will be avoided. After sending the message in step E9, the mobile station releases the designated common channel in step E10.

Referring to FIG. 20B, in step F1, the base station receives from the mobile station the channel request signal and the information about the message that the mobile station intends to send. In step F2, the base station analyzes the received information to determine whether or not to permit the mobile station to use the designated common channel for the reverse link. To permit the mobile station to use the designated common channel, the base station sends in step F3 the channel assignment command (i.e., ACK signal) and associated channel assignment information to the mobile station via the forward link common channel On the other hand, to permit the mobile station not to use the designated common channel, the base station sends the NAK signal to the mobile station in step F11. In the meantime, after sending the ACK signal in step F3, the base station waits for the predefined time TG in step F4, taking into consideration the time in which the ACK signal reaches the mobile station. The initial power control procedure and the actual message receiving procedure in steps F5–F9 which will be performed after a lapse of the time TG, are equal to the procedures in steps B1–B5 of FIG. 18B. Thus, detailed descriptions will be avoided. After receiving the message in step F9, the base station releases the designated common channel in step F10.

Figure 21A:
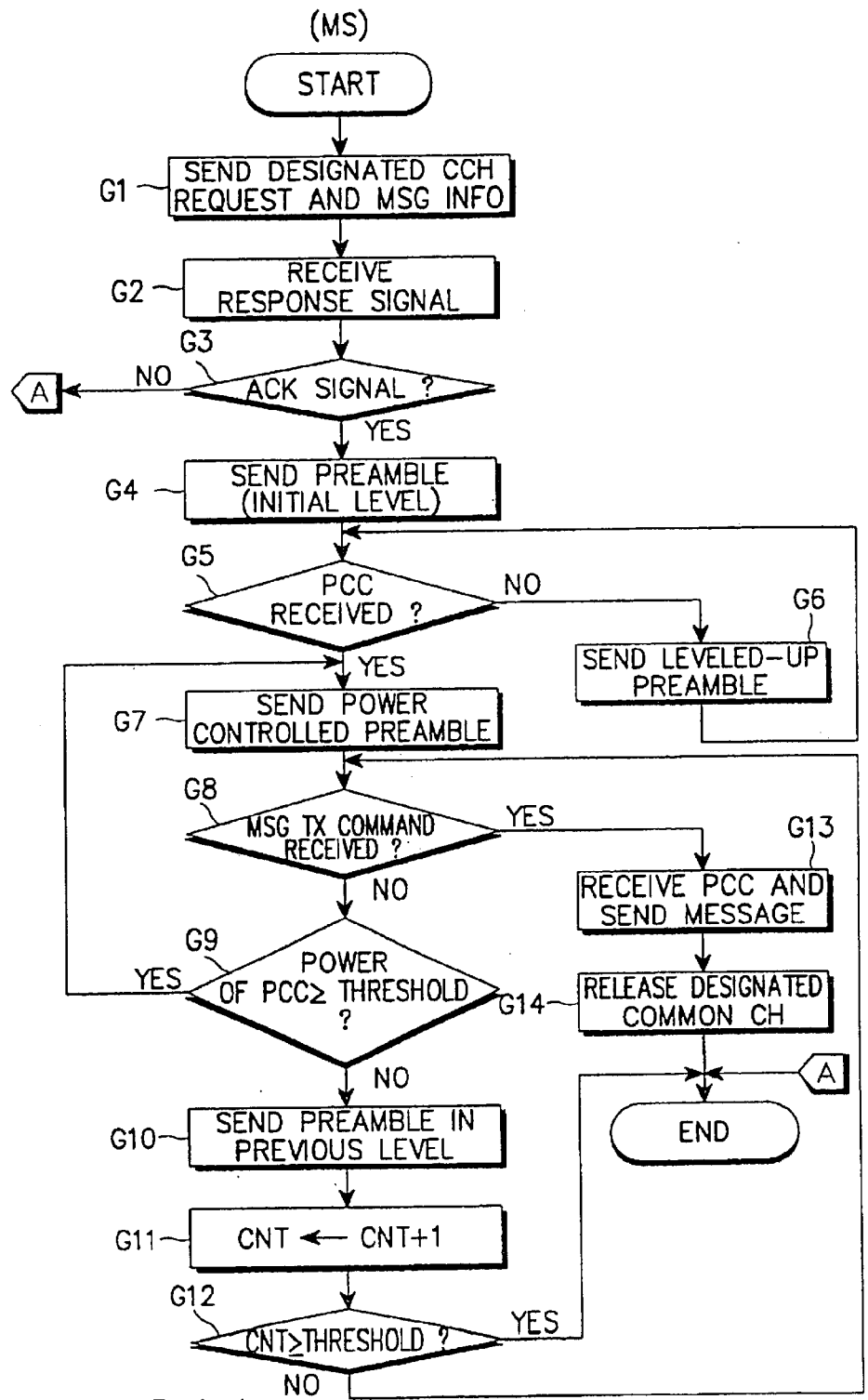
FIGS. 21A and 21B are flow charts illustrating operations of the base station and the mobile station when a message is transmitted by power controlling the designated common channel for the reverse link in accordance with another embodiment of the present invention.
Figure 21B:
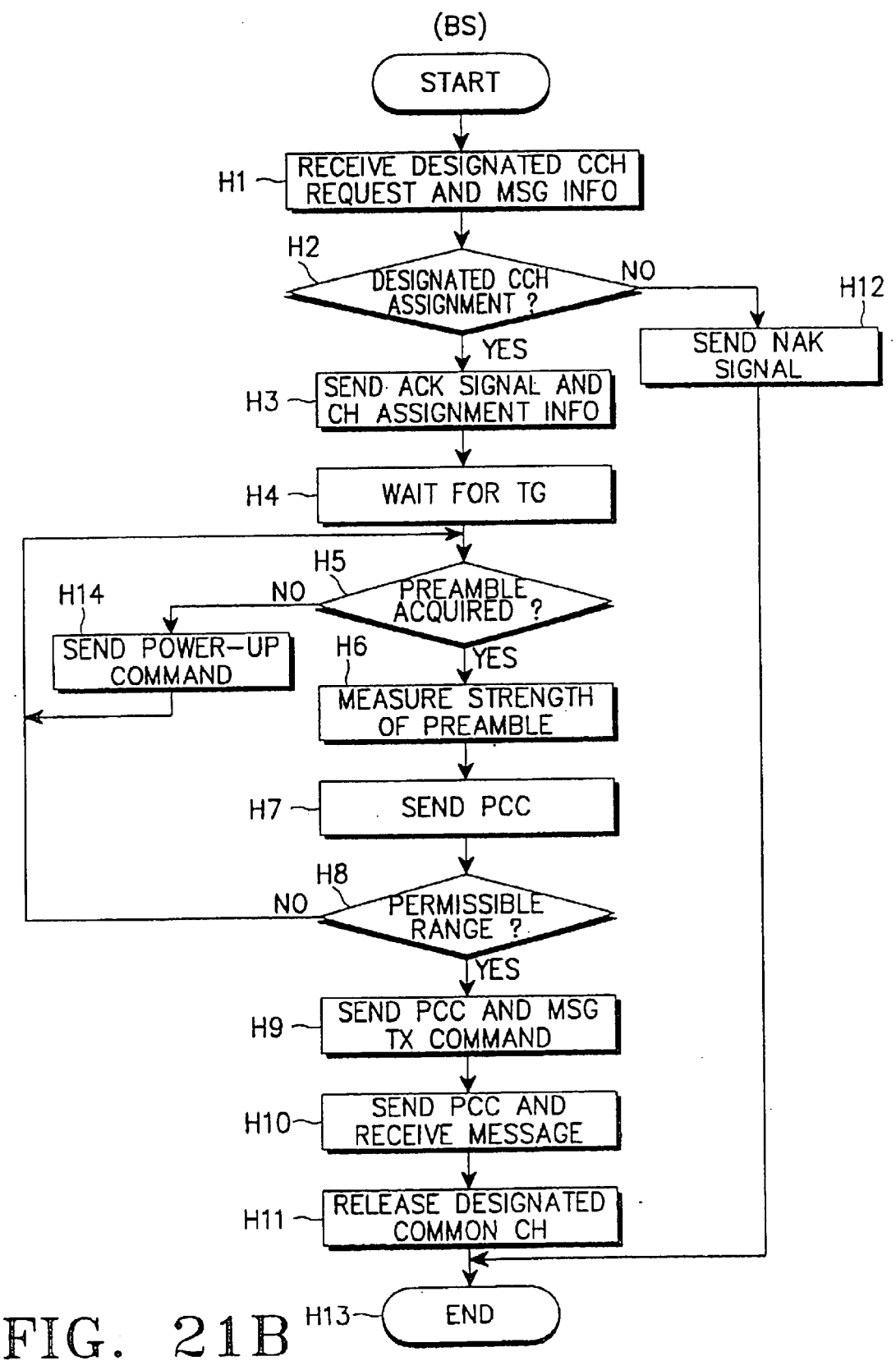

FIGS. 21A and 21B are flow charts illustrating operations of the base station and the mobile station when a message is transmitted by power controlling the designated common channel for the reverse link according to a further embodiment of the present invention. In this embodiment, the base station informs the mobile station about the message transmission time during initial power control between the mobile station and the base station, in the same way as in the embodiment represented by the flow charts of FIGS. 19A and 19B. Alternatively, the mobile station sends an intended message at a time predetermined between the mobile station and the base station. However, unlike the embodiment of FIGS. 19A and 19B, this embodiment performs the power control for the designated common channel only, a channel request and assignment operation for the designated common channel should precede.

Referring to FIG. 21A, in step G1, the mobile station sends a channel request message to the base station in order to use the designated common channel. The mobile station can send information about the message to send, together with the channel request message. The base station then analyzes the information sent from the mobile station to determine whether to use the designated reverse link common channel. When it is intended to use the designated reverse link common channel, the mobile station sends a channel assignment command and associated channel assignment information as a response signal via the forward link common channel (See steps H1, H2, H3 and H12 of FIG. 21B).

The mobile station receives the response signal in step G2, and determines is step G3 whether the response signal corresponds to an acknowledge signal ACK or a negative acknowledge signal NAK. Here, the ACK signal represents that the base station permits the mobile station to use the designated reverse link common channel, and the NACK signal represents that the base station does not permit the mobile station to use the designated reverse link common channel. Upon reception of the ACK signal, the mobile station performs the initial power control and then sends the intended message at a predetermined time or upon reception of a message transmission command from the base station, as shown in steps G4–G13. Since procedures in steps G4–G13 are equal to those in steps C1–C10 of FIG. 19A, the detailed descriptions will be avoided. After sending the message in step G13, the mobile station releases the designated common channel in step G14.

Referring to FIG. 21B, in step H1, the base station receives from the mobile station the channel request signal and the information about the message that the mobile station intends to send. In step H2, the base station analyzes the received information to determine whether or not to permit the mobile station to use the designated common channel for the reverse link. To permit the mobile station to use the designated common channel, the base station sends in step H3 the channel assignment command (i.e., ACK signal) and associated channel assignment information to the mobile station via the forward link common channel.

On the other hand, to permit the mobile station not to use the designated common channel, the base station sends the NAK signal to the mobile station in step H11. In the meantime, after sending the ACK signal in step H3, the base station waits for the predefined time TG in step H4, taking into consideration the time in which the ACK signal reaches the mobile station. The initial power control procedure and the actual message receiving procedure in steps H5–H9 which will be performed after a lapse of the time TG, are equal to the procedures in steps D1–D6 of FIG. 19B. Thus, the detailed descriptions will be avoided. After receiving the message in step H10, the base station releases the designated common channel in step H11.

FIGS. 22A through 25B illustrate several methods of transmitting a message according to the methodologies of the present invention. More specifically, there are shown several examples of controlling the power during a standby state after transmission of the message. In the drawings, PA denotes a preamble signal to be transmitted and MSG denotes a message signal to be transmitted.

FIGS. 22A and 22B show methods of transmitting an intended message by dividing it into several message blocks of a predetermined size. After sending one message block, the mobile station sends a next message block upon reception of the ACK signal and resends the original message block upon reception of the NAK signal or upon failure to receive the ACK signal for a predefined time. The mobile station does not control the power during a standby state after sending one message block. Therefore, before sending the next message block or resending the transmitted message block, the mobile station transmits the preamble signal for initial power control.

FIG. 22A shows a method for transmitting the message in the case where the pilot channel is not used in the reverse link, and FIG. 22B shows a method for transmitting the message in the case where the pilot channel is used in the reverse link. The structure and operation for the cases where the pilot channel is used or not used in the reverse link have been described with reference FIGS. 8A to 14.

FIGS. 23A and 23B show methods of transmitting an intended message by dividing it into several message blocks of a predetermined size in the same manner as FIGS. 22A and 22B. After sending one message block, the mobile station sends a next message block upon reception of the ACK signal and resends the original message block upon reception of the NAK signal or upon failure to receive the ACK signal for a predefined time. These message transmission methods are different from the methods of FIGS. 22A and 22B in that the mobile station controls the power at a pause after transmission of one message block. In this case, since the power is controlled even at the pause between the message blocks being transmitted, it is not necessary to transmit the preamble signal to control the initial power when transmitting the next message block or resending the transmitted message block. In particular, FIG. 23B shows the case where the pilot channel of the reverse link is continuously transmitted for the power control of the reverse link, even for the duration where there is no message to transmit.

Figure 24A:
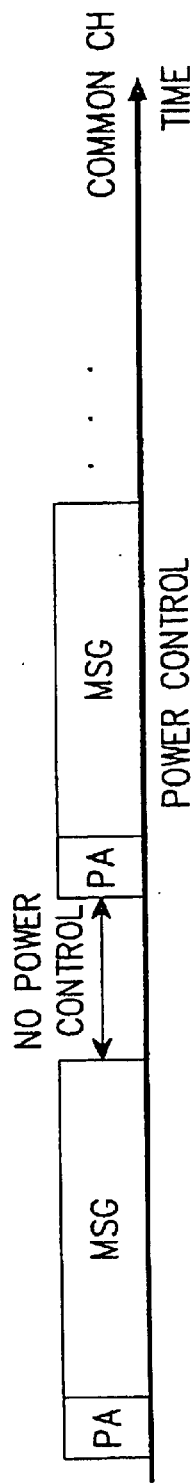
Figure 24B:
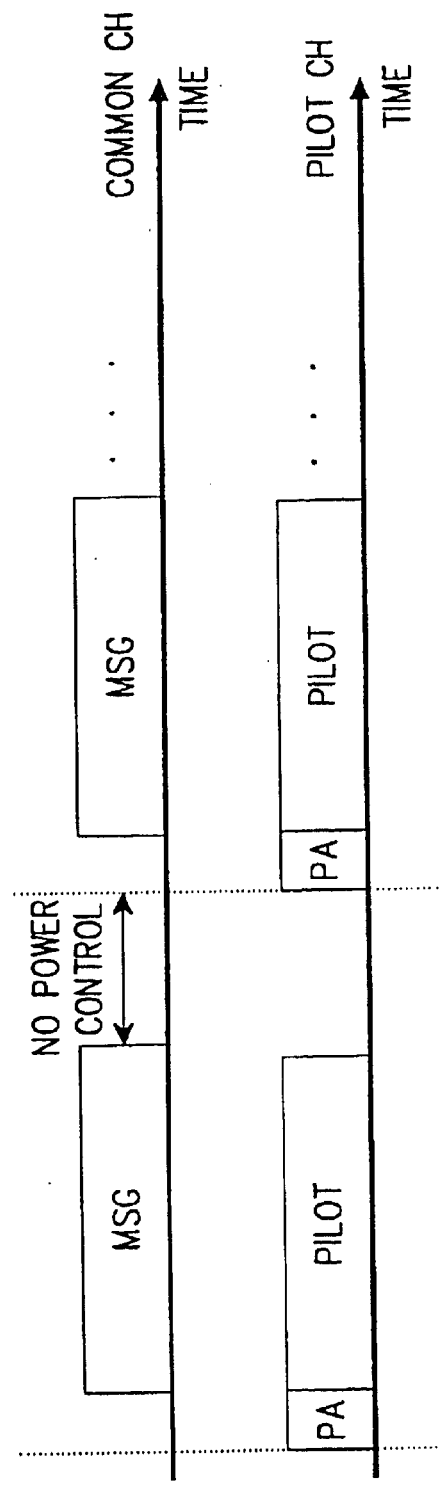

FIGS. 24A and 24B show methods of waiting for the ACK signal to be received after sending the whole intended message at a time. In these methods, the power is not controlled while waiting for the ACK signal to be received. Therefore, when the NAK signal is received or when the ACK signal is not received for the predefined time, the mobile station transmits the preamble signal for the initial power control prior to resending the message. FIG. 24A shows a method for transmitting the message in the case where the pilot channel is not used in the reverse link, and FIG. 22B shows a method for transmitting the message in the case where the pilot channel is used in the reverse link.

Figure 25A:
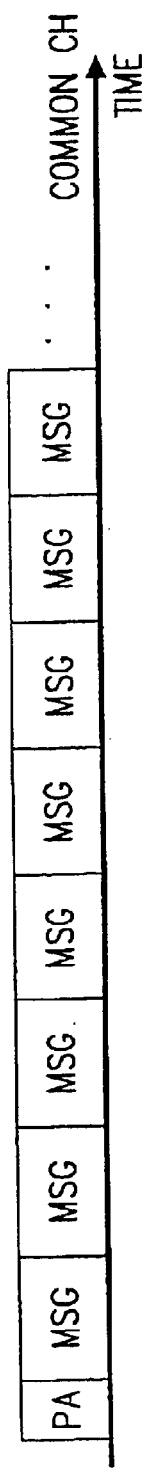
Figure 25B:
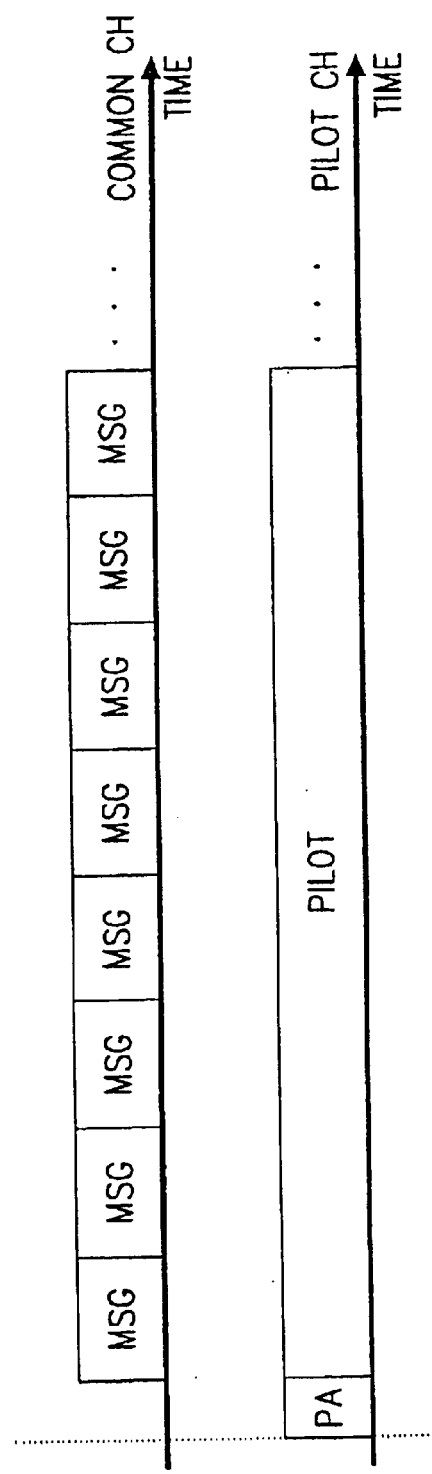

FIGS. 25A and 25B show methods of divisionally transmitting an intended message into several message blocks of a predetermined size and receiving ACK signals for the respective message block transmitted. In accordance with these methods, upon failure to receive the ACK signal for a predefined time or upon reception of the NAK signal, the mobile station should retransmit the message block in one of the following two methods: a first method retransmits only the message for which the NAK signal is received and the message for which the ACK signal is not received for the predefined time; a second method retransmits all the message blocks succeeding the message block for which the NAK signal is received or for which the ACK signal is not received for the predefined time. For example, assume that the ACK signal for a third message block is not received for the predefined time or the NAK signal for the third message block is received during transmission of a fifth message block. In this case, the first method retransmits only the third message block after transmitting the fifth message block, and the second method retransmits the third to fifth message blocks after transmitting the fifth message block. FIG. 25A shows the message transmission method in the case where the pilot channel is not used in the reverse link and FIG. 25B shows message transmission method in the case where the pilot channel is used in the reverse link.

In the present invention, the forward common power control channel is proposed for the power control of the reverse link common channel. The forward common power control channel can be also used for another purpose. As another application, the forward common power control channel can be used for power control of the control channels. In the IMT-2000 system, dedicated control channels are employed to increase a call quality of the mobile station and to secure an efficient data communication. In general, there is no difficulty in applying a dedicated control channel for the reverse link to the system. However, when forward link dedicated control channels are assigned to the respective mobile stations, the orthogonal codes are assigned for the respective forward link dedicated control channels, resulting in exhaustion of the orthogonal codes.

To reduce the number of the orthogonal codes assigned for the forward link dedicated control channels, the present invention uses the sharable control channel which can be shared by multiple mobiles stations on a time-shared (or time-division) basis. In a system using the sharable control channel, a single orthogonal code is assigned to the sharable control channel and multiple subscribers transmit/receive control information using the sharable control channel. Here, the subscribers can be distinguished by scrambling transmission data using different long codes. However, since one channel, i.e., one orthogonal channel is used by several subscribers on a time-shared basis, it is difficult to transmit the power control command for the reverse link. It is possible to transmit the power control command via the common power control channel, as in the power control for the reverse link common channel. Therefore, by transmitting the power control command via the separate common power control channel, it is possible to transmit the power control command without wasting the orthogonal code when there is no data to transmit. Furthermore, in the novel common power control channel scheme, several subscribers transmit and receive their corresponding power control commands by sharing the same orthogonal code. Therefore, it is possible to control the power with a reduced number of the orthogonal codes.

For a structure in which the base station simultaneously transmits the common control channel and the common power control channel to the mobile station and a structure in which the mobile station simultaneously receives the two channels, the schemes shown in FIGS. 11–17 can be used.

In light of the foregoing descriptions, since the power control is performed through the reverse link common channel, the time required to access the system is reduced and the system can transmit long bust messages. Furthermore, an initial system access power can be appropriately adjusted, minimizing an influence on the system. In addition, the novel CDMA communication system transmits the power control commands for multiple subscribers via the common power control channel using a single orthogonal code, thereby increasing utility efficiency of the orthogonal codes. Therefore, it is possible to transmit the power control commands by using a reduced number of orthogonal codes.

Although illustrative embodiments of the present invention have been described herein with reference to the accompanying drawings, it is to be understood that the invention is not limited to these precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for controlling a reverse link common channel in a code division multiple access (CDMA) communication system, comprising the steps of:

receiving, at a base station, a signal transmitted from a mobile station via a reverse link common channel;

designating, at the base station, a spreading code to be used for the reverse link common channel; and transmitting to the mobile station a power control command for controlling a transmission power of the reverse link common channel.

2. The method as claimed in claim 1, wherein said power control command is transmitted via a forward link common power control channel.

3. The method as claimed in claim 1, wherein the base station receives the signal transmitted from the mobile station via said designated reverse link common channel using said designated spreading code.

4. The method as claimed in claim 3, wherein the base station receives, from the mobile station, information representing an amount of data to be transmitted via the designated common channel.

5. The method as claimed in claim 1, wherein the base station designates said spreading code to be used for the reverse link common channel by request of the mobile station.

6. The method as claimed in claim 1, wherein said signal is a preamble signal and/or a message signal.

7. The method as claimed in claim 6, wherein the base station receives the message signal from the mobile station, after attaining initial acquisition by receiving the preamble signal for a predefined time.

8. The method as claimed in claim 6, wherein the base station informs the mobile station about a message signal transmission time.

9. The method as claimed in claim 1, wherein the power control command is transmitted via the forward link common power control channel, wherein a message that the base station sends to the mobile station to designate the spreading code to be used for the reverse link common channel includes information representing a long code to be used by the mobile station for the reverse link common channel.

10. The method as claimed in claim 1, wherein for designation of the reverse link common channel, the base station determines a long code to be used as a spreading sequence by the mobile station.

11. The method as claimed in claim 1, wherein the base station transmits a power-up command to the mobile station until said signal is acquired.

12. The method as claimed in claim 9, wherein the long code is a public long code generated according to a unique number of the mobile station.

13. The method as claimed in claim 9, wherein the long code is assigned in such a manner that one of the long codes separately provided to prevent a collision with reverse link common channels for other mobile stations is assigned, and the assigned long code is not assigned again to the other mobile stations while the mobile station uses the assigned long code.

14. A method for controlling a reverse link common channel in a CDMA communication system, comprising the steps of:

transmitting, at a base station, a permission command to use a spreading code via a forward link common channel, to designate a spreading code to be used for a reverse link common channel to a mobile station;

receiving, at the base station, a signal that the mobile station transmits by spreading a reverse link common channel using the designated spreading code; and sending, at the base station, to the mobile station a power control command for controlling a transmission power of the reverse link common channel according to a strength of the received signal.

15. A method for controlling a reverse link common channel of a mobile station in a CDMA communication system, comprising the steps of:

transmitting, at the mobile station, a signal to a base station via a reverse link common channel;

receiving, at the mobile station, a power control command from the base station after transmission of the signal, and a spreading code to be used for a reverse link common channel designated by the base station; and controlling, at the mobile station, a transmission power of the reverse link common channel according to the received power control command.

16. The method as claimed in claim 15, wherein the power control command is received via a forward link common channel.

17. The method as claimed in claim 15, wherein the mobile station transmits the common channel signal to the base station using the designated spreading code.

18. The method as claimed in claim 15, wherein the reverse link common channel is designated by request of the mobile station.

19. The method as claimed in claim 15, wherein the signal is a preamble and/or a message.

20. The method as claimed in claim 19, wherein the mobile station transmits the message to the base station, after transmitting the preamble for a predefined time.

21. The method as claimed in claim 19, wherein the mobile station transmits the message to the base station, upon reception of information representing message transmission time from the base station.

22. The method as claimed in claim 15, wherein the spreading code is a public long code determined by a user unique number.

23. The method as claimed in claim 18, further comprising the step of transmitting, at the mobile station, information representing an amount of data to be transmitted to the base station via the designated reverse link common channel.

24. The method as claimed in claim 15, wherein the mobile station discontinues transmission via said reverse link common channel, when a power of the received power control command is lower than a threshold value.

25. The method as claimed in claim 15, wherein the mobile station discontinues transmission via the reverse link common channel, when the power level of a forward link is less than a predetermined value.

26. The method as claimed in claim 15, wherein the mobile station determines an initial transmission power of the reverse link common channel based on a formula given by:

Initial Transmission Power=(Given Constant)−(Total Receiving Power of Mobile Station) [dB].

27. The method as claimed in claim 15, wherein the mobile station determines an initial transmission power of the reverse link common channel based on a formula given by:

Initial Transmission Power=(Given Constant)−(Receiving Power of Pilot Signal from Connected Base Station) [dB].

28. The method as claimed in claim 1, wherein the signal is a preamble signal and/or a message signal.

29. The method as claimed in claim 28, wherein the base station receives the message signal from the mobile station after performing an initial acquisition by receiving the preamble signal for a predefined time.

30. The method as claimed in claim 15, wherein a long code is designated from a plurality of previously provided long codes used by other mobile stations, so as to prevent a collision between a signal spread by said designated long code and reverse link common channels for other mobile stations.

31. A base station device for a CDMA communication system, comprising:

a common power control channel transmitter for forming a common power control channel for controlling transmission powers of reverse link common channels for multiple subscribers, transmitting power control commands for the corresponding subscribers via the common power control channel, and assigning, at the base station, a spreading code to be used for a reverse link common channel; and at least one subscriber channel transmitter for transmitting data and control commands to the multiple subscribers via a forward link.

32. The base station device as claimed in claim 31, wherein the subscriber channel transmitter comprises:

an encoder for encoding data on a subscriber channel into symbol data;

a puncture position controller for generating a pseudo-randomized puncture position control signal; and a puncturer for receiving in sequence the symbol data output from the encoder and puncturing the symbol data according to the puncture position control signal.

33. The base station device as claimed in claim 31, wherein the common power control channel transmitter comprises:

a selector for receiving the power control commands to be transmitted to the multiple subscribers and multiplexing the received power control commands; and spreading modulator for spreading an output of the selector by multiplying the output of the selector by a spreading sequence, and then transmitting the spread signal.

34. The base station device as claimed in claim 33, further comprising a slot controller for controlling the selector in such a manner that the power control commands, output from the selector, for the respective subscriber are arranged, in the respective power control groups, at pseudo-randomized positions.

35. The base station device as claimed in claim 34, wherein the common power control channel is used by multiple subscribers on a time-division basis.

36. The base station device as claimed in claim 34, wherein the common power control channel transmitter uses a single orthogonal code.

37. The base station device as claimed in claim 34, wherein the subscriber channel transmitter comprises:

an encoder for encoding data on the subscriber channel into symbol data; and an orthogonal spreader for orthogonally spreading the encoded symbol data with an orthogonal code.

* * * * *